United States Patent [19]
Sugawa

[11] Patent Number: 5,917,960
[45] Date of Patent: Jun. 29, 1999

[54] IMAGE CORRELATOR, AN IMAGE PROCESSING APPARATUS USING THE SAME, AND A SIGNAL ADDER USED IN THE IMAGE CORRELATOR

[75] Inventor: Shigetoshi Sugawa, Atsugi, Japan

[73] Assignee: Canon Kabushiki Kaisha, Tokyo, Japan

[21] Appl. No.: 08/786,958

[22] Filed: Jan. 23, 1997

[30] Foreign Application Priority Data

| Jan. 31, 1996 | [JP] | Japan | 8-015677 |
| Feb. 8, 1996 | [JP] | Japan | 8-022356 |
| Feb. 8, 1996 | [JP] | Japan | 8-022357 |

[51] Int. Cl.$^6$ .................. G06K 15/316; G06K 17/15; G11C 16/04
[52] U.S. Cl. .................. 382/278; 382/216; 382/218; 382/219; 382/276; 382/289; 382/312; 365/185.01; 365/185.21; 365/185.26; 364/728.03; 364/748.11
[58] Field of Search .................. 382/278, 289, 382/276, 218, 216, 219, 312; 365/185.01, 185.21, 185.26; 364/728.03, 748.11

[56] References Cited

U.S. PATENT DOCUMENTS

| 3,761,876 | 9/1973 | Flaherty et al. | 340/146.3 |
| 4,071,775 | 1/1978 | Hewes | 307/221 D |
| 4,813,006 | 3/1989 | Burns et al. | 364/604 |
| 4,816,910 | 3/1989 | Hasimoto et al. | 358/213.27 |
| 4,864,629 | 9/1989 | Deering | 382/34 |
| 5,020,113 | 5/1991 | Lo et al. | 382/42 |
| 5,049,758 | 9/1991 | Mead et al. | 307/246 |
| 5,324,980 | 6/1994 | Kusunoki | 257/74 |
| 5,467,368 | 11/1995 | Takeuchi et al. | 375/206 |

FOREIGN PATENT DOCUMENTS

| 06053431 | 2/1994 | Japan . |

*Primary Examiner*—Leo H. Boudreau
*Assistant Examiner*—Kanji Patel
*Attorney, Agent, or Firm*—Fitzpatrick, Cella, Harper & Scinto

[57] ABSTRACT

In order to reduce the size of an apparatus capable of obtaining a result of correlation between images at a high speed, a multiplex selector for shifting addresses of a plurality of memories, a detector for detecting an amount stored in a memory element of one of the plurality of memories and an amount stored in a memory element obtained by shifting an address of the one of the plurality of memories, and a determination unit for obtaining correlation between outputs of the detector for each amount of shift.

52 Claims, 13 Drawing Sheets

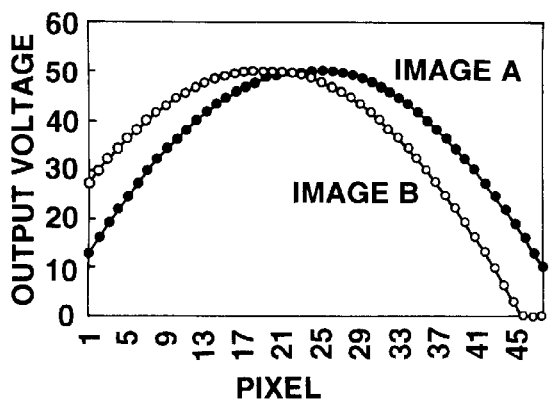
FIG.6(A) OUTPUT OF CMOS MEMORY
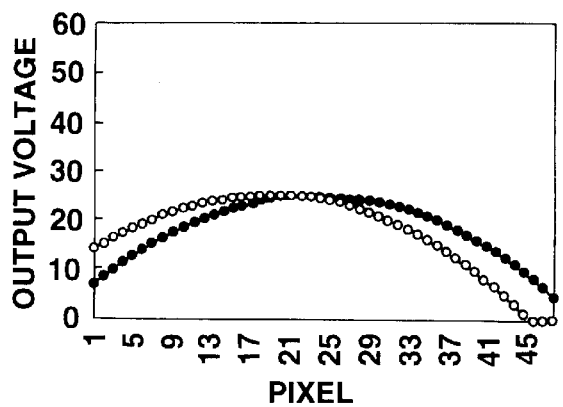
FIG.6(B) OUTPUT OF CMOS MEMORY
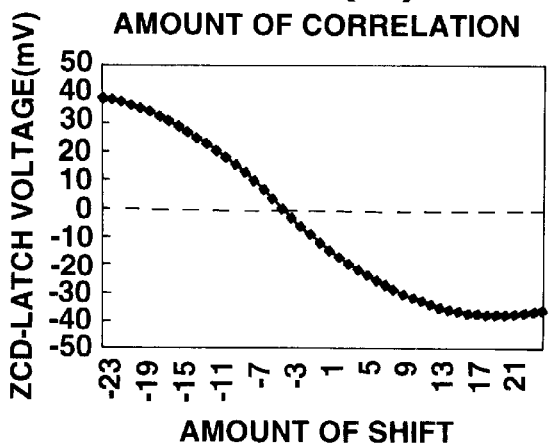
FIG.6(C) AMOUNT OF CORRELATION
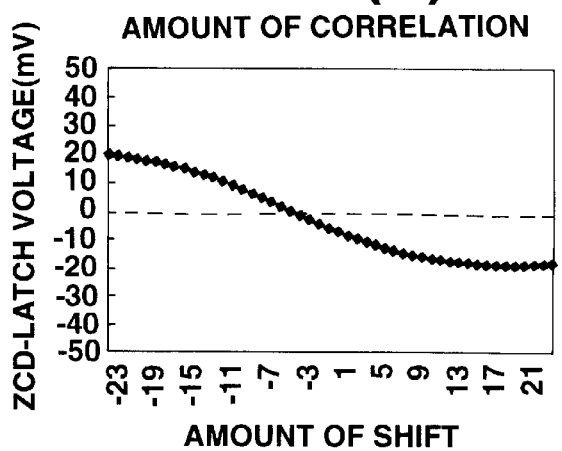
FIG.6(D) AMOUNT OF CORRELATION
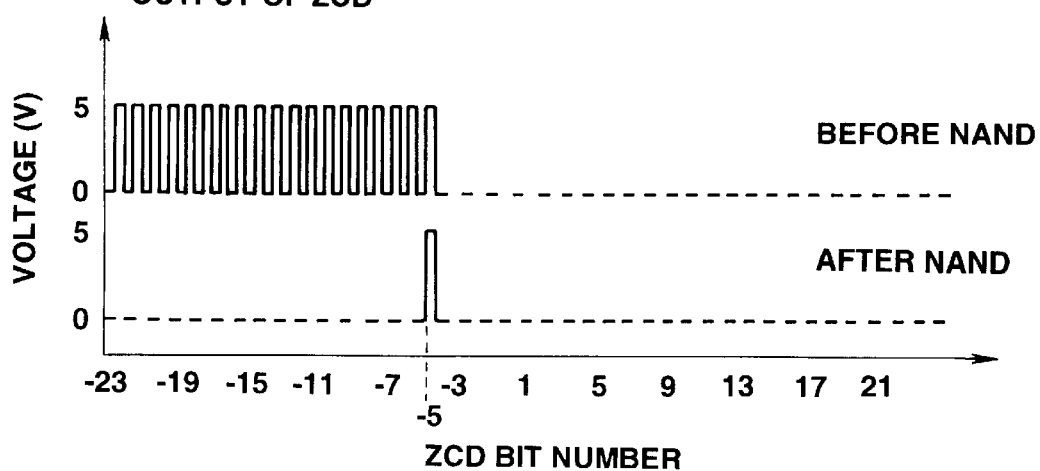
FIG.6(E)

OUTPUT OF MEMORY CELL

OUTPUT OF MEMORY CELL

AMOUNT OF CORRELATION

AMOUNT OF CORRELATION

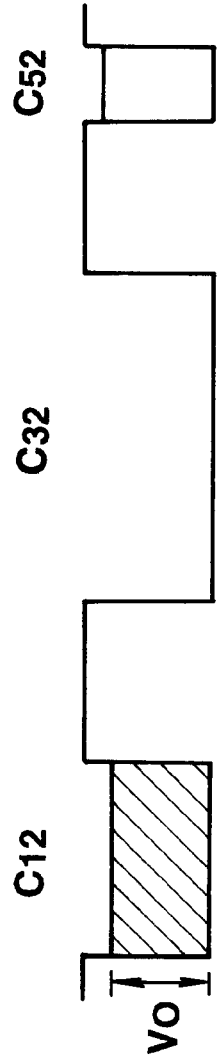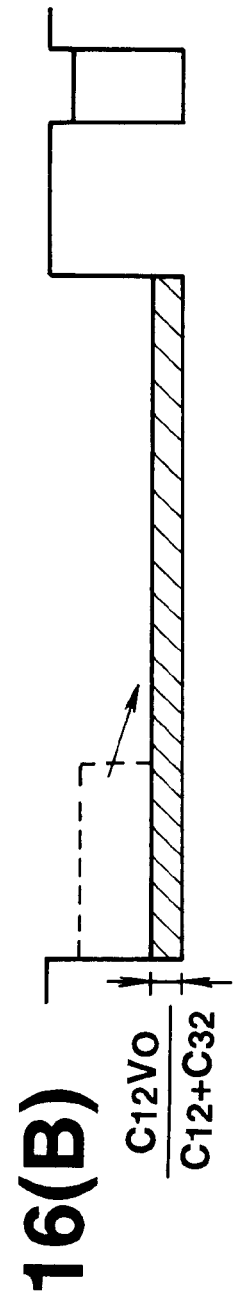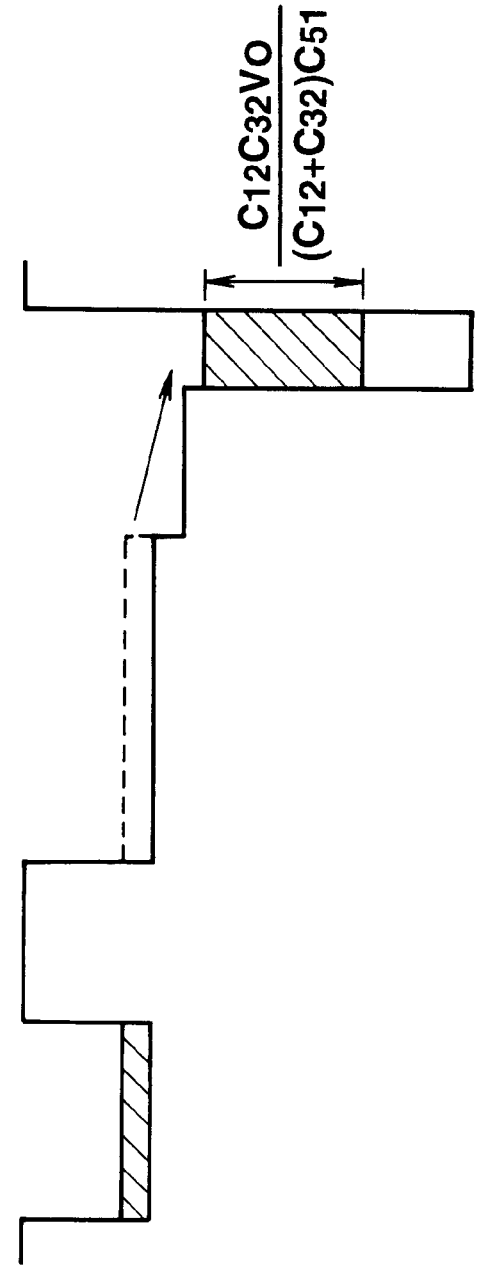

IMAGE CORRELATOR, AN IMAGE PROCESSING APPARATUS USING THE SAME, AND A SIGNAL ADDER USED IN THE IMAGE CORRELATOR

BACKGROUND OF THE INVENTION

1. Field of the Invention

This invention relates to an image correlator and to an image processing apparatus, such as an image processing circuit, a device for detecting the movement of a video signal, an autofocus camera or the like. More particularly the invention relates to an image correlator capable of detecting and following the movement of a specific portion of a moving image, to an image processing apparatus for detecting the degree of correlation of a predetermined still image with respect to a separately provided still image and determining the difference between the two still images, and to a signal adder which is preferably used in such an apparatus.

2. Description of the Related Art

An image correlator or an image comparator has the following function. That is, an image and a comparative image, serving as reference, are stored in a plurality of memory devices. The values of the luminance, hue and saturation, in the case of a color image, and the values of the luminance, in the case of a monochromatic image of corresponding points of the two images are compared with each other. The degree of similarity of the two images is determined by obtaining the degree of correlation, for example, within the range of "0", indicating a difference in the luminance level of at least 20 dB, to "1" indicating the difference equal to substantially 0 dB. Thus, image correlation can be obtained by determining the degree of similarity of the two images.

When detecting the degree of correlation between still images, the correlation can be obtained somehow even if the number of calculation processes is large because of allowance in time. On the other hands when determining and following the movement of a specific image by an image correlator, correlation is compared between the shape recognition of a first image and the shape recognition of a comparative image obtained after a predetermined time period (for example, for one frame). If correlation is high, the two images are determined as being substantially the same image. If correlation is low, the two images are determined as being entirely different images. For example, if the first image and the comparative image are shifted from each other in a lateral direction in a square display region, the amount of shift where a maximum correlation value is obtained corresponds to the amount of movement in the lateral direction, when obtaining correlation by shifting the comparative image in the lateral direction. Similarly, if the first image and the comparative image are shifted from each other in a longitudinal direction in a square display region, the amount of shift where a maximum correlation value is obtained corresponds to the amount of movement in the longitudinal direction, when obtaining correlation by shifting the comparative image in the longitudinal direction.

In order to measure the amount of shift, it is necessary to measure the amount of correlation by comparing the entire images by sequentially shifting the images from each other by the amount of a pixel and to obtain the amount of shift (measured, e.g., by number of pixels) where the amount of correlation has a maximum value. Hence, a storage capacity for a very large number of image signals, a calculation circuit for shifting the entire images, and a plurality of calculation circuits for obtaining correlation are required. It is difficult for the current technical level to satisfy the above-described requirements for ordinary moving images, although the need is strong.

When obtaining correlation between images, a matching technique for a specific image and a comparative image, serving as reference, is, in some cases, required. A technique for finding a point of an image where the local pattern of the density of the image is stepwise, and to find a point where a given density pattern is present is termed the matching technique. When matching a pattern with an image, a simple pattern to be matched, such as a step, a slope, a line or a point, or a "template" representing a known object is used. For example, a target template is fitted to an image obtained from a monitoring system, a target template is fitted to an image obtained from a navigation system, or a template having the shape of a star is fitted to an image of the sky. As an actual example, a pattern comprises a portion of an image, and the pattern is matched with another portion of the image. In this case, if two images photographed from different visual points are used and two portions of the two images are identified to represent the same place of a scene, stereoscopic parallax can be measured. It is thereby possible to determine the height and the distance of an object within a scene. It is also possible to measure the relative movement of an object within a scene using two images photographed at different times. That is, by executing the matching technique, the movement of a moving image can be followed by performing a tracking technique, such as raster tracking, a multidirection tracking technique or the like, in a longitudinal or lateral direction. However, it is difficult to achieve the above-described image matching technique, tracking technique or the like in real time unless parallel pipeline calculation or large-capacity high-speed calculation can be performed.

More specifically, a description will be provided illustrating the detection of hand movement. The above-described pattern matching technique is often used in movement detection according to image recognition. The movement is detected by comparing a photographed image with the image of the immediately preceding frame. For example, an image comprising about 8×8 pixels is matched with the preceding image. If it is assumed that matching is obtained by moving the image by two pixels in the x direction and three pixels in the y direction, this amount corresponds to the amount of hand movement. The amount is expressed by:

$$e(\xi, \eta) = \Sigma |g0(x-\xi, y-\eta) - g1(x, y)|.$$

The value $(\xi, \eta)$ for providing the minimum value of the value $e(\xi, \eta)$ corresponds to the motion vector. Some recent microprocessors, for example, $\mu$PD78335, include correlation calculation commands for facilitating the above-described calculation. However, even such microprocessors cannot deal with an image comprising a large number of pixels in real time. Particularly, if a minimum point is obtained by sequentially shifting the image by a point, the amount of calculation is very large, and therefore it is still difficult to obtain correlation in real time.

As described above, it is extremely difficult to obtain image correlation, and particularly difficult to detect the movement of a moving image in a real time.

It is difficult to calculate and output the amount of shift of pixels for providing the maximum correlation value between two images using an apparatus having a small circuit scale and capable of performing high-precision correlation calculation.

Next an adder used in an image correlator will be described.

Conventionally, an operational amplifier having a low-input-impedance common terminal where a signal from each input terminal is input via a respective resistor is generally used for a circuit for adding analog signals. A fixed voltage is applied to another input terminal of the operational amplifier. The gain of the operational amplifier can have a constant value according to the value of the resistor connected to each input terminal. Accordingly, predetermined weighting can be provided for an input voltage supplied to each input terminal.

However, the addition circuit using the operational amplifier requires a large area, and it is difficult to form such a circuit on a substrate for dealing with both digital and analog signals, because it is also necessary to provide a space for connecting analog circuits to digital circuits in addition to the area for the operational amplifier. Accordingly, there is no adder which satisfies requirements for reduction of circuit scale, reliability in circuit connection, and the like.

SUMMARY OF THE INVENTION

According to one aspect, the present invention relates to a correlator for detecting correlation between a plurality of groups of information signals, comprising detection means for detecting a maximum value or a minimum value of a group of cell signals selected from the corresponding groups of information signals by comparing the selected cell signals with each other, combination changing means for changing a combination of cell signals to be compared with each other, calculation means for calculating output signals from the detection means, and comparison means for comparing an obtained result of calculation with a reference signal in accordance with the combination of cell signals determined by the combination changing means.

According to another aspect, the present invention relates to a signal adder comprising a plurality of first semiconductor layers for individually inputting signals, a plurality of first gates, each overlapped with a part of a corresponding one of the plurality of first semiconductor layers, a plurality of second gates, each overlapped with a part of a corresponding one of the plurality of first gates, at least one third gate overlapped with a part of the plurality of second gates, and a second semiconductor layer overlapped with a part of the third gate.

According to still another aspect, the present invention relates to an image correlator for detecting correlation between a plurality of images, comprising a plurality of memories, each for storing a corresponding one of the plurality of images, a selection switch for shifting addresses of the plurality of memories, a detection circuit for detecting a maximum value or a minimum value of a signal of each memory cell of one of the plurality of memories and a signal of each memory cell having a shifted address of another memory, and adjacent-output-difference output circuit for outputting the difference between adjacent outputs from among outputs for respective pixels of the detection circuit.

According to still another aspect, the present invention relates to an image processing circuit comprising first and second image memories, each comprising a plurality of memory cells for storing signals corresponding to images, a multiplexing selector for reading a signal from each of the memory cells of the first image memory and for shifting the read signal by a predetermined number of pixels, detection means for comparing the signal of a memory cell of the first image memory and the signal of a memory cell of the second image memory with each other and for detecting a maximum value or a minimum value of the signals, and adjacent-value-difference output means for obtaining the difference between a maximum value or a minimum value of the memory cell and a maximum value or a minimum value of an adjacent memory cell.

According to still another aspect, the present invention relates to an image correlator for detecting correlation between a plurality of images, comprising a plurality of memories, each for storing a corresponding one of the plurality of images, a selection switch for shifting addresses of the plurality of memories, detection means for comparing a signal stored in each memory cell of one of the memories and a signal stored in a memory cell having a shifted address of another memory with each other and for outputting a signal stored in one of the memory cells.

According to still another aspect, the present invention relates to an image correlator for detecting correlation between a plurality of images, memories for storing he plurality of images, a multiplex selector for shifting the outputs of the memories, correlation means for comparing the output of one of the memories with a shifted output and for taking out a result of comparison for each amount of shift, and determination means for determining an amount of shift where the output of the correlation means has a maximum value.

According to still another aspects the present invention relates to an image processing apparatus for determining an amount of difference between a predetermined image and a separately provided image by detecting a degree of correlation between the images comprising a plurality of laterally disposed first photoelectric transducers for reading the predetermined image, a plurality of laterally disposed second photoelectric transducers for reading the separately provided image, first memories for sequentially storing outputs of the first photoelectric transducers in a longitudinal direction, second memories corresponding to the plurality of second photoelectric transducers for sequentially storing outputs of the second photoelectric transducers in a longitudinal direction, a multiplex selector for shifting the output of the second memories in the lateral direction for the longitudinal direction, correlation means for obtaining correlation between the outputs of the first memories and the outputs of the second memories taken out for every amount of shift in the lateral direction, and determination means for determining an amount of shift where the output of the correlation means has a maximum value.

BRIEF DESCRIPTION OF THE DRAWINGS

FIGS. 6(A)–6(E) are diagrams illustrating the states of respective units of the image correlator shown in FIG. 1;

FIGS. 16(A)–16(C) are schematic diagrams illustrating energy levels at respective transfer states of the signal adder shown in FIGS. 14(A) and 14(8)

DESCRIPTION OF THE PREFERRED EMBODIMENTS

First Embodiment

Figure 1:
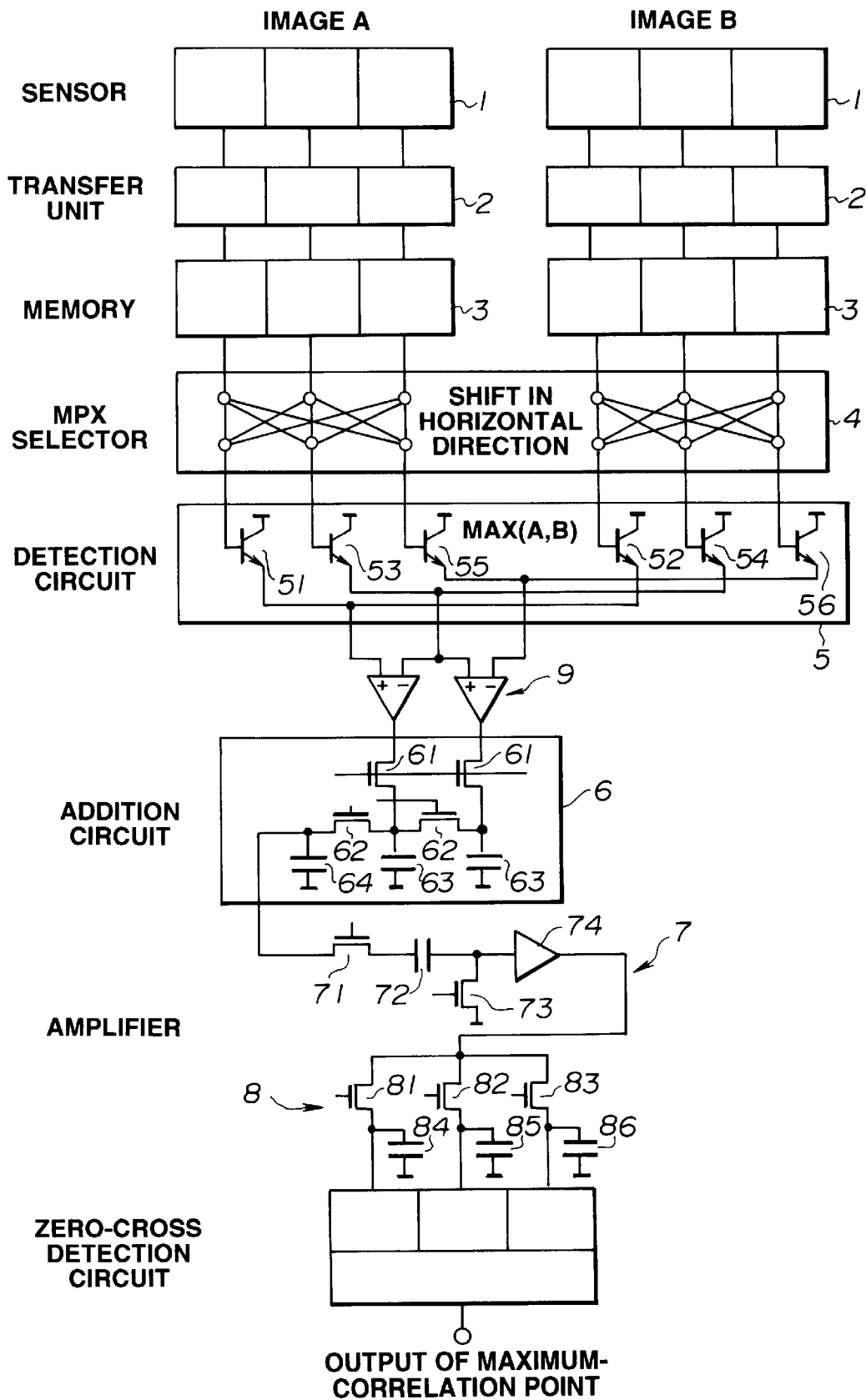
FIG. 1 is a block diagram illustrating the configuration of an image correlator according to a first embodiment of the present invention.

FIG. 1 is a block diagram illustrating an image correlator according to a first embodiment of the present invention. In the first embodiment, a peak detection circuit, a multiplex selector, an addition circuit and a ZCD (zero-cross detection) circuit are used as means for detecting the maximum value or the minimum value, combination changing means, calculation means and comparison means, respectively. In FIG. 1, reference numeral 1 represents sensors, serving as signal sources, for reading images A and B, each comprising a plurality of photoelectric transducers for sensing light and converting the light into an electric signal. Transfer units 2 are provided if necessary, and transfer image signals from the sensors 1 directly or by removing noise components. Each of memories 3 includes memory cells whose number equals the number of elements of the sensor 1. The memories 3 temporarily store the image signals transferred from the transfer units 2. A multiplex (hereinafter abbreviated as "MPX") selector 4, serving as changing means (selection switches), outputs the image signal from the corresponding memory 3 by shifting it in the horizontal direction, for example, by one element (one cell), two elements (two cells) or the like, or outputs the image signal of a specific portion of a frame by shifting it by one frame or two frames when obtaining correlation in the vertical direction. A detection circuit 5 outputs a peak signal for respective outputs of object pixels of the MPX selector 4. Each of adjacent-output-difference detection circuits 9 detects the difference between the peak outputs of adjacent pixels from among the peak outputs of object pixels of the detection circuit 5. An addition circuit 6, serving as a calculation circuit, adds the outputs of the adjacent-output-difference detection circuits 9 and outputs the obtained result. An amplifier 7 shifts the output of the addition circuit 6 to a level most suitable for the circuit of the next stage. A zero-cross detection circuit 8 detects a point of maximum correlation.

Figure 2:
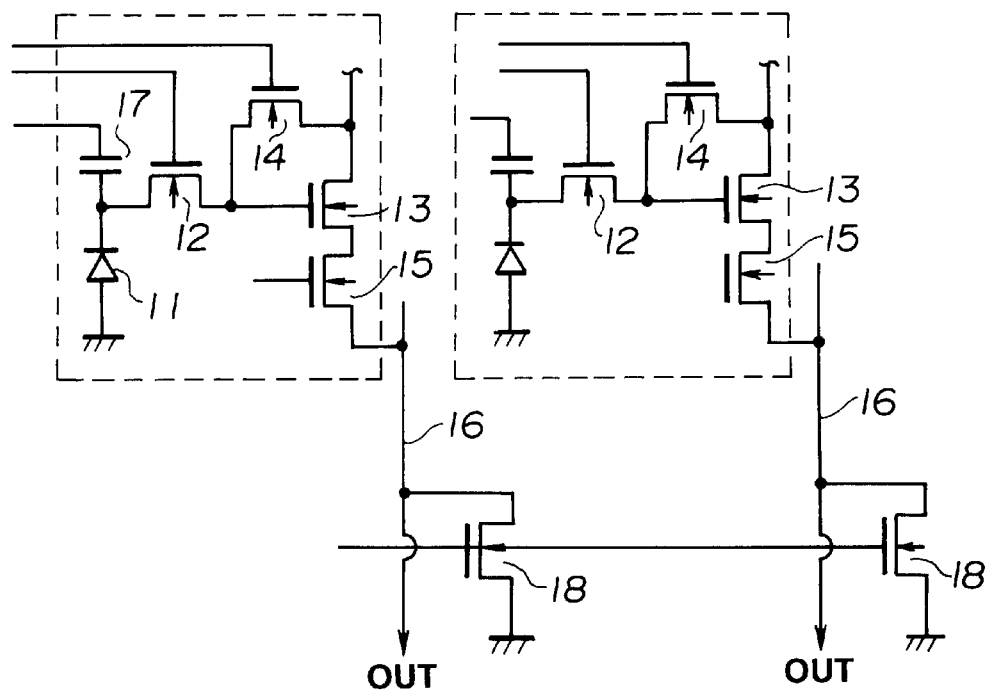
FIG. 2 is circuit diagram illustrating a specific example of photoelectric transducers according to the first embodiment.

A description will now be provided of the respective blocks. First, a circuit suitable for each element of the sensors 1 will be described with reference to FIG. 2. Each element of the sensors 1 is formed according to a CMOS (complementary metal oxide semiconductor) process, and comprises a photodiode 11, a capacitor 17 formed between an electrode formed above the photodiode 11 and the photodiode 11, a transfer MOS transistor 12 for transferring photoelectric charges stored in the photodiode 11, an amplifying MOS transistor 13 for amplifying the photoelectric charges by a source follower, a reset MOS transistor 14 for resetting the potential of the gate electrode portion of the amplifying MOS transistor 13, and a switching MOS transistor 15 connected to the source of the amplifying MOS transistor 13. The gates of the transfer MOS transistor 12, the reset MOS transistor 14 and the switching MOS transistor 15 are driven by timing control signals from a scanning circuit, to efficiently amplify photoelectric charges from the photodiode 11 and output the resultant signal. The load at the source side of the amplifying MOS transistor 13 comprises a load MOS transistor 18 connected to a vertical output line 16. The gate of the load MOS transistor 18 is also controlled at an appropriate timing.

Each element of the sensors 1 operates in the following manner. First, the cathode of the photodiode 11 and the gate potential of the amplifying MOS transistor 13 are reset by the reset MOS transistor 14 (a resetting operation) After completing the resetting operation, photoelectric charges of the photodiode 11 are stored while receiving an external image for a predetermined time period (a storage operation). The stored photoelectric charges are read by switching on the transfer MOS transistor 12, the switching MOS transistor 15 and the load MOS transistor 18 (a reading operation). The resetting operation, the storage operation and the reading operation are repeated in this sequence. Thus, pixel signals are read from the sensors 1. A plurality of one-dimensionally or two-dimensionally arranged photodiodes are used for the sensors 1. Several tens of thousands or more of photodiodes are used for a high-resolution sensor.

In the first embodiment, pixel signals are sequentially read for each line from the photodiodes 11 arranged one-dimensionally or two-dimensionally for the images A and B, and are output to the transfer circuits 2, and signals are compared for respective pairs of pixels.

The transfer circuits 2 can be configured merely by switching MOS transistors. The transfer circuit 2 transfers its output signal to the corresponding memory 3 in the next stage in synchronization with another timing control signal. A circuit for removing a noise component caused by dark charges may be added to the transfer circuit 2.

The memory 3 has substantially the same configuration as the sensor 1, except that a capacitor is dispoded instead of the photodiode 11. A circuit for storing signal charges from the transfer circuit 2 in the capacitor is preferably used. At a writing timing for storing signal charges, a writing operation is performed by turning on the resetting MOS transistor 14 and the transfer MOS transistor 12. At a reset timing for resetting charges stored in the capacitor, a resetting operation is performed by turning on the resetting MOS transistor 14 and the transfer MOS transistor 12. At a timing for reading signal charges, a timing control signal is supplied to the gate electrodes of the transfer MOS transistor 12, the switching MOS transistor 25 and the load MOS transistor 18, to read signal charges stored in the capacitor via the gate-source of the amplifying MOS transistor 13. Accordingly, the memory 3 is a memory having a large destructive limit for a stored signal. A signal is read from the memory 3 a plurality of times in order to obtain correlation by the HPX selector 4 provided at the next stage. Since electric charges stored in the memory 3 are not destructed, the same signal is read.

The sensors 1, the transfer circuits 2 and the memories 3 can be integrally manufactured by a CMOS process. These components may, of course, be separately manufactured and thereafter combined.

The MPX selector 4 outputs the outputs of respective pixels read from one of the memories 3 to the detection circuit 5 while sequentially shifting the outputs by one pixel. In order to obtain the maximum value of the degree of correlation between images, the output terminals of sequentially read memory cells are selected, and obtained signals are output by being shifted in the horizontal direction. For example, if each image comprises 256 pixels (cells), one operation of obtaining the degree of correlation is completed by sequentially shifting pixel signals to the left by 256 times at most. FIG. 1 illustrates a case of comparing right and left images for which correlation is to be obtained. The right and left images may comprise images of the same object at different times, or images of the same object simultaneously photographed by sensors provided at different positions. Various modifications are possible depending on the object of obtaining the degree of correlation. The HPX selector 4 may, for examples comprise an analog shift register, or may read data from the memories using a microcomputer and output lines may be input to a matrix circuit and be selectively output.

The detection circuit 5 outputs a peak value of outputs from two memory cells of the memories 3 storing information of the images A and B. Even if there is no correlation between images, the output of a larger level from among the two outputs is obtained. For example, a signal having a higher emitter output voltage level from among the outputs of npn transistors 51 and 52 is input to the adjacent-output-difference detection circuit 9 provided at the next stage. Similarly, as for pairs of npn transistors 53 and 54, and 55 and 56, signals having higher emitter output voltage levels are input to the adjacent-output-difference detection circuit 9.

The adjacent-output-difference detection circuit 9 outputs the difference between the peak output detected for each pair of cells and the peak output detected for adjacent pair of cells.

The addition circuit 6 stores charges of respective differences in corresponding capacitors 63, and thereafter stores the sum of charges stored in the capacitors 63 in an addition capacitor 64. More specifically, each difference output is stored in the corresponding capacitor 63 by turning on a MOS switching transistor 61. Then, the sum of charges stored in the capacitors 63 are stored in the addition capacitor 64 by turning on corresponding addition MOS transistors 62. Functionally, the capacitor 63, serving as a low-impedance analog memory, is charged. If the capacitance of the capacitor 63 is represented by C, and the voltages of the respective capacitors 63 are represented by V1 and V2, the voltage V stored in the addition capacitor 64 is expressed by:

$$V = (CV1 + CV2)/(C + 2C).$$

As a result, the mean value of the voltages of the capacitors 63 is stored in the addition capacitor 64.

The amplifier 7 amplifies the addition output stored in the addition capacitor 64 of the addition circuit 6. A switching MOS transistor 71 is turned on, for example, at each timing of an output obtained by shifting the output of each cell. A coupling capacitor (clamping capacitance) 72 for cutting off a DC component and setting an appropriate reference DC level enables a level shift by removing a DC offset from the addition output. A reset MOS transistor 73 resets the potential of an input terminal of an amplifier 74 for every input of an addition output so that the output of the reset MOS transistor 73 is amplified by the amplifier 74. Thus, signal amplification is performed with a predetermined gain so as to be able to maintain the accuracy of a circuit for detecting a desired voltage (hereinafter termed a "ZCD circuit" or a "zero-cross detector") provided at the next stage.

The ZCD circuit 8 sequentially turns on switching MOS transistors 81–83 at every timing of an output obtained by sequentially shifting the signal by a cells and sequentially stores the outputs of the switching MOS transistors 81–83 at respective timings in time-serial latch capacitors 84–86, respectively. The position where the minimum value of the outputs is output as the position of maximum correlation between the images A and B.

Before describing the ZCD circuit 8 in detail, a description will be provided of the structure of a υMOS transistor which is preferably used in this circuit. The MOS transistor is a four-terminal device having unique features with respect to a parallel processing capability, controllability of changing a threshold, and A/D (analog-digital) compatibility, and can be made in substantially the same process as that for the sensors and therefore can effectively realize its features in on-chip input image processing on a single substrate.

Figure 3:
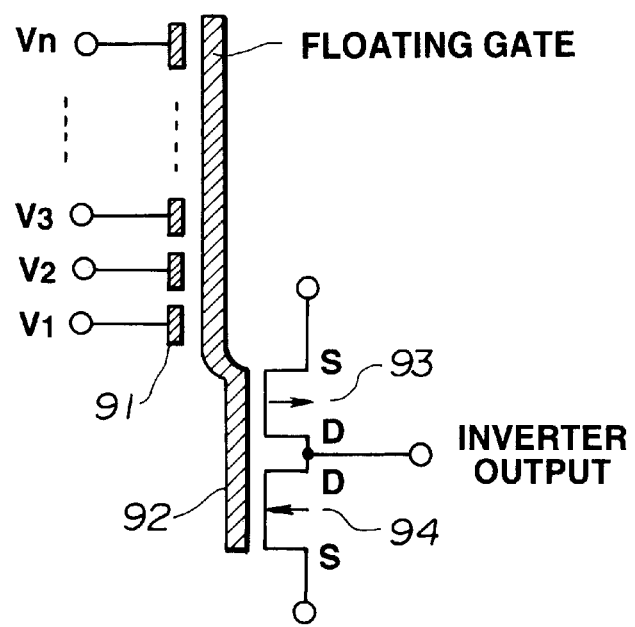
FIG. 3 is a diagram illustrating the structure of a υMOS transistor.

FIG. 3 illustrates the structure of the υMOS transistor. In FIG. 3 multi-input-terminal voltages V1, V2, V3, ..., Vn 91 are input to n input terminals. These input terminals are in a state of capacitive coupling with a common floating gate 92. The sum of charges input to respective capacitors becomes an input voltage to an inverter while being divided by the capacitances of capacitors, each configured by the floating gate 92 and the region between the source and the drain of the corresponding MOS structure, and the output of the inverter corresponding to the input voltage is obtained. The inverter output is input to a sense amplifier the potential of an input terminal of which is usually in a reset state. When the inverter output is high, a high-level high-sensitivity digital output can be obtained.

By using the above-described υMOS transistors having a floating gate for providing capacitive coupling with multi-input-terminals in the addition circuit 6, the ZCD circuit 8 or other small-scale high-speed analog-to-digital conversion circuits, it is possible to achieve space saving in each circuit, and to easily obtain, for example, results of high-speed calculation, or calculation of maximum and minimum values.

Figure 4:
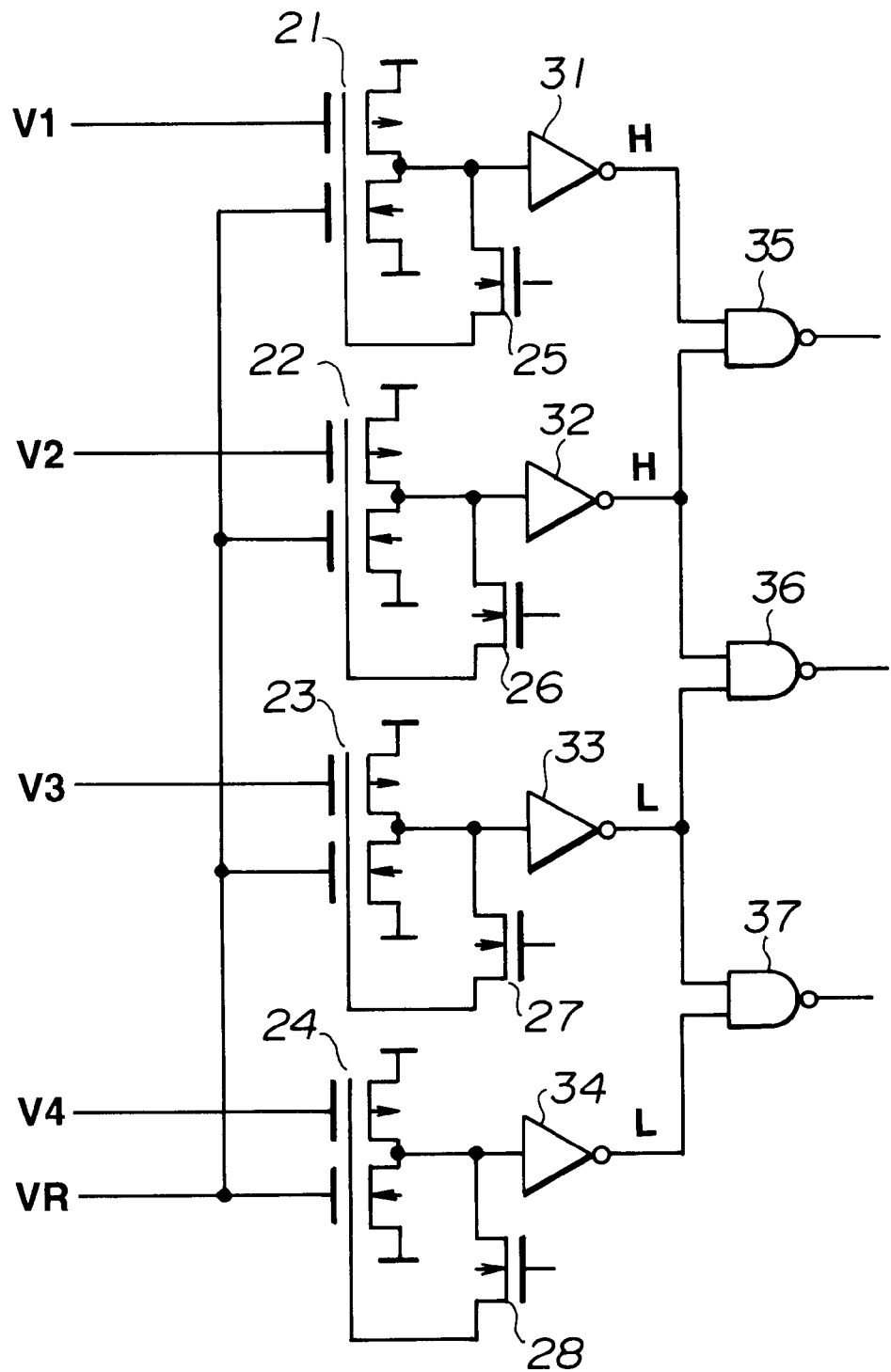
FIG. 4 is a circuit diagram illustrating a specific example of a ZCD circuit of the image correlator shown in FIG. 1.

FIG. 4 illustrates an example of circuitry of the ZCD circuit 8 having four input terminals for detecting a zero-cross point. The position determined by the amount of shift of pixels (cells) corresponding to the zero-cross point corresponds to the position of maximum correlation. In FIG. 4, reference numerals 21–24 represent the above-described υMOS transistors having two input gates. A signal input terminal and a reset-voltage input terminal for supplying a predetermined voltage of a corresponding one of the υMOS transistors are coupled with a floating gate. Reset MOS transistors 25–28 reset the potentials of corresponding floating gates by connecting the outputs of the υMOS transistors 21–24 to the corresponding floating gates, respectively. Inverters 31–34 invert the outputs of the υMOS transistors 21–24, respectively NAND circuits 35–37 receive the outputs of the corresponding adjacent inverters.

It is assumed that input voltages at the respective input terminals have the relationship of V1>V2>VR>V3>V4. If a potential VR is set to the reset terminal, high-level signals are output to the inverters 31 and 32, low-level signals are output to the inverters 33 and 34, and to the NAND circuit 35, a high-level signal is output to the NAND circuit 36, and a low-level signal is output to the NAND circuit 37. Accordingly, it is detected that the cross point between the VR and the input voltage is between the input voltages V2 and V3.

Figure 5:
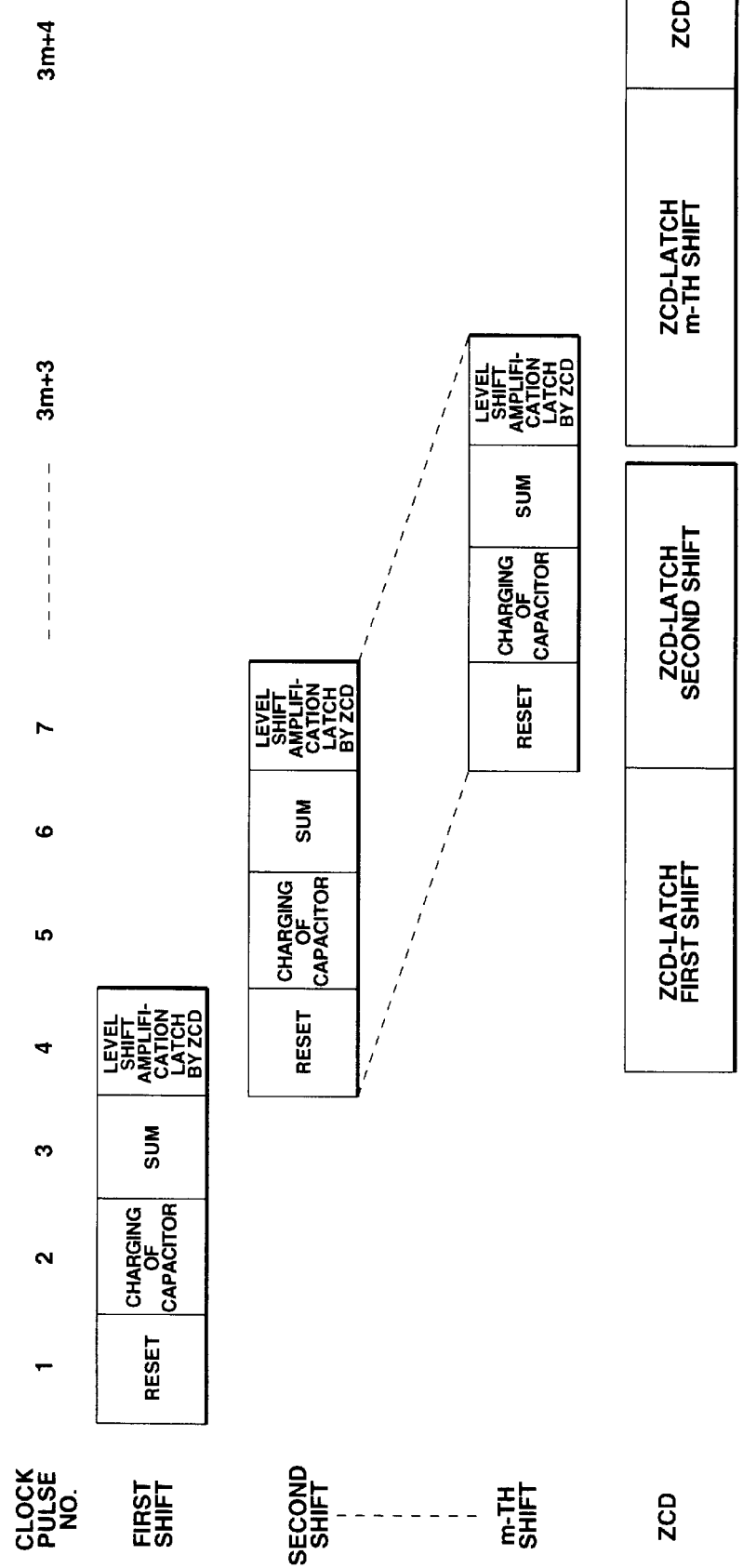
FIG. 5 is a diagram illustrating operational states of the image correlator shown in FIG. 1.

A method for driving a high-precision input-image correlator will now be described in more detail with reference to FIG. 5. FIG. 5 illustrates an example of sequentially shifting, for example, the image B by the MPX selector 4 for clock pulse Nos. 1, 2, . . . , 3m+2, 3m+3, 3m+4. In a first shift, reset is performed at the first clock pulse. At the second clock pulse, the drive of the MPX selector 4, peak detection and difference detection, and charging of the capacitor of the addition circuit are performed. The result of addition is charged in the addition capacitor at the third clock pulse. At the fourth clock pulse, a level shift, an amplification operation and latch by the ZCD circuit 8 are performed. Thus, a signal is sequentially shifted by four clock pulses. At the second shift, latch by the ZCD circuit 8 is performed by being delayed by two clock pulses from the end of latch by the ZCD circuit 8 at the first shift, and the signal is latched by the ZCD circuit 8 by being delayed by three clock pulses. After latching all cells, the zero-cross point is detected by the ZCD circuit 8, and the shift position indicating the zero-cross point is obtained. This is the shift position indicating maximum correlation.

FIGS. 6(A)–6(E) show the states of respective blocks. In this case, the images A and B shift by –5 pixels, and a –5 shift position is the position indicating the maximum correlation value. FIG. 6(A) illustrates the output of a CMOS memory. The abscissa represents pixels comprising 48 bits, and the ordinate represents the output voltage. FIG. 6(B) illustrates a case of a small input amount of light. In FIG. 6(C), the abscissa represents the amount of shift in which the pixels comprising 48 bits are divided into plus and minus portions, and the ordinate represents the ZCD-latch voltage. FIG. 6(C) indicates that an image corresponding to the amount of shift of –5 bits where the minimum amount of shift crosses the zero point has highest correlation. FIG. 6(D) illustrates a case of a small amount of light (when the level of the ZCD latch voltage is low) FIG. 6(E) illustrates the relationship between the inverter output of the ZCD circuit and the amount of shift of the image and the relationship between the NAND output of the ZCD circuit and the amount of shift of the image, and indicates that a high-level signal is output form the NAND circuit only when the image is shifted by –5 pixels. This point can also be exactly detected in FIG. 6(D).

Although in the first embodiment, the case of using CMOS-type sensors and CMOS-type memories manufactured by a CMOS process has been illustrated, image sensors in which a capacitive load is connected to the emitter of a phototransistor, or CCD's (charge-coupled devices) may be used as a signal sources.

Second Embodiment

Figure 7:
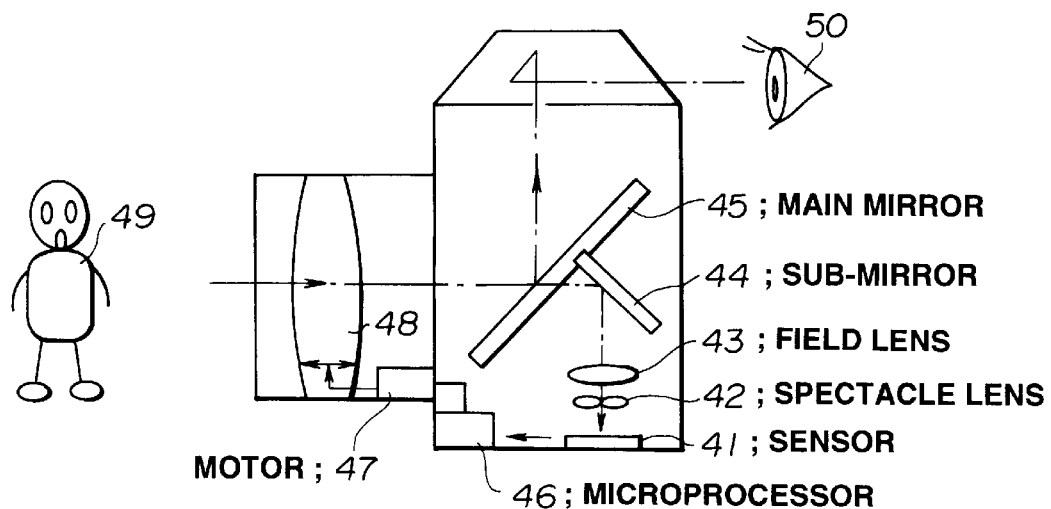
FIG. 7 is a schematic diagram illustrating the configuration of an AF (autofocus) system according to a second embodiment of the present invention.
Figure 8:
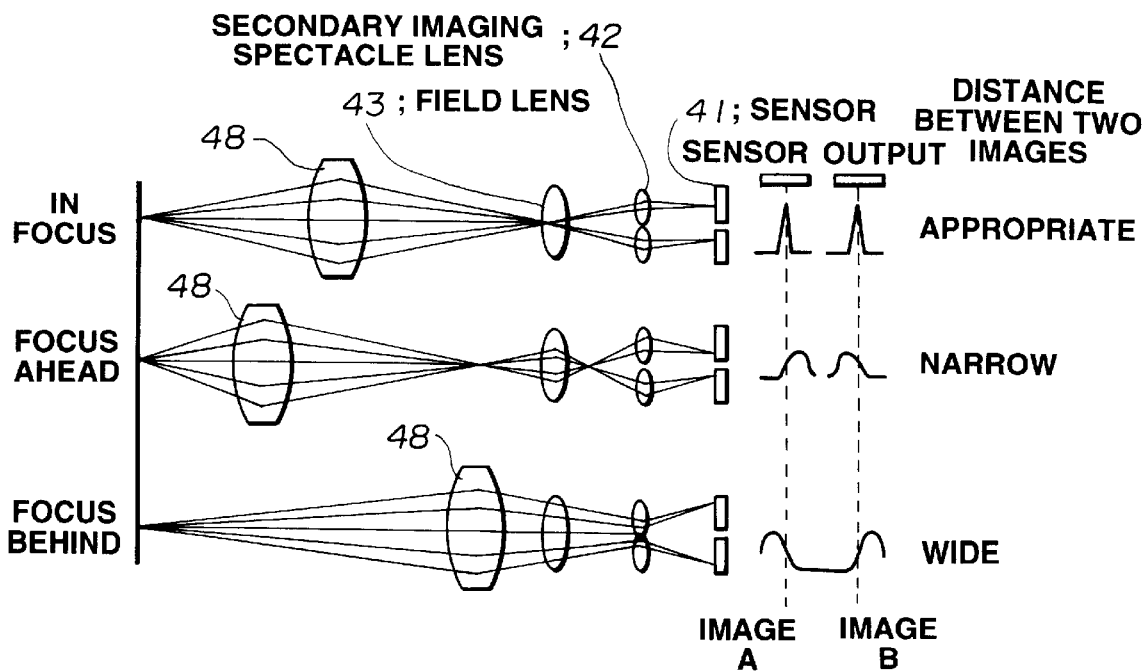
FIG. 8 is a schematic diagram illustrating the operation of the AF system shown in FIG. 7.

A description will now be provided of an AF (autofocus) sensor for automatically performing focusing in a silver-chloride or silver-halide-film camera, a video camera or the like using the above-described image correlator according to a second embodiment of the present invention, with reference to FIGS. 7 and 8. If a system capable of performing analog-signal correlation calculation in a one-dimensional space with a small-scale circuit can be mounted in such an AF sensor, an excellent autofocusing apparatus can be obtained.

In FIG. 7, light reflected from an object 49 to be focused reaches sensors 41 after passing through a main lens 48, a main mirror 45, a sub-mirror 44, a field lens 43 and a spectacle lens 42. The light sensed by the sensor 41 is converted into an electric signal according to photoelectric conversion, and the signal is transmitted to a microprocessor 46 as an image signal. When the object 49 is out of focus, an operation of again reading the image is performed by driving a motor 47. This operation is repeated until the object 49 is in focus. FIG. 8 illustrate the pathes of the light beam and sensor outputs when the main lens 48 fucuses the object on a focus plane, in front of the focus plane, and behind the focus plane. When the levels of the outputs of the two sensors 41 have a maximum value, it is determined that a focus state is obtained. In this case, for example, the outputs of respective pixels of the sensor for the image A are made to be reference, and correlation between the images A and B are obtained by sequentially shifting the outputs of respective pixels of the sensor for the image B by one pixel. If the amount of shift of correlation relative to the arrangement of the two sensors equals predetermined bits (pixels), and the amount of shift where the highest degree of correlation is obtained coincides with the predetermined bits, it is determined that a focus state is obtained. For example, in the case of focus ahead, the correlation peak is less than the predetermined bits. Hence, an instruction to move the main lens 48 backward is transmitted from the microprocessor 46 to the motor 47. This operation is continued until it is determined that a focus state is provided. At that time, if the above-described image correlator is used, bits of the shift of the image can be precisely detected at a high speed. In addition, since the burden on the microprocessor 46 is weakened, the processing capability of the microprocessor 46 can be used for other functions.

Conventionally, this correlation is obtained by software of the microprocessor in order to increase the speed of calculation. If the image correlator incorporating the ZCD circuit shown in FIG. 1 is used in the image sensor, the speed of image calculation is increased without increasing the capacity of the memory of the microprocessor, and, as described above, an autofocusing function can be achieved at a high speed in a real time with a small-scale configuration.

As described above, the image correlator of the present embodiment can calculate and output the amount of shift of pixels where correlation between two images has a maximum value using on-chip image sensors, and can achieve very precise correlation calculation with a small circuit scale by time serially shifting pixels.

By using this image correlator in an AF sensor, it is possible to obtain precise image correlation at a high speed and to detect an autofocus point while reducing the load of a microprocessor mounted in a camera.

Third Embodiment

Figure 9:
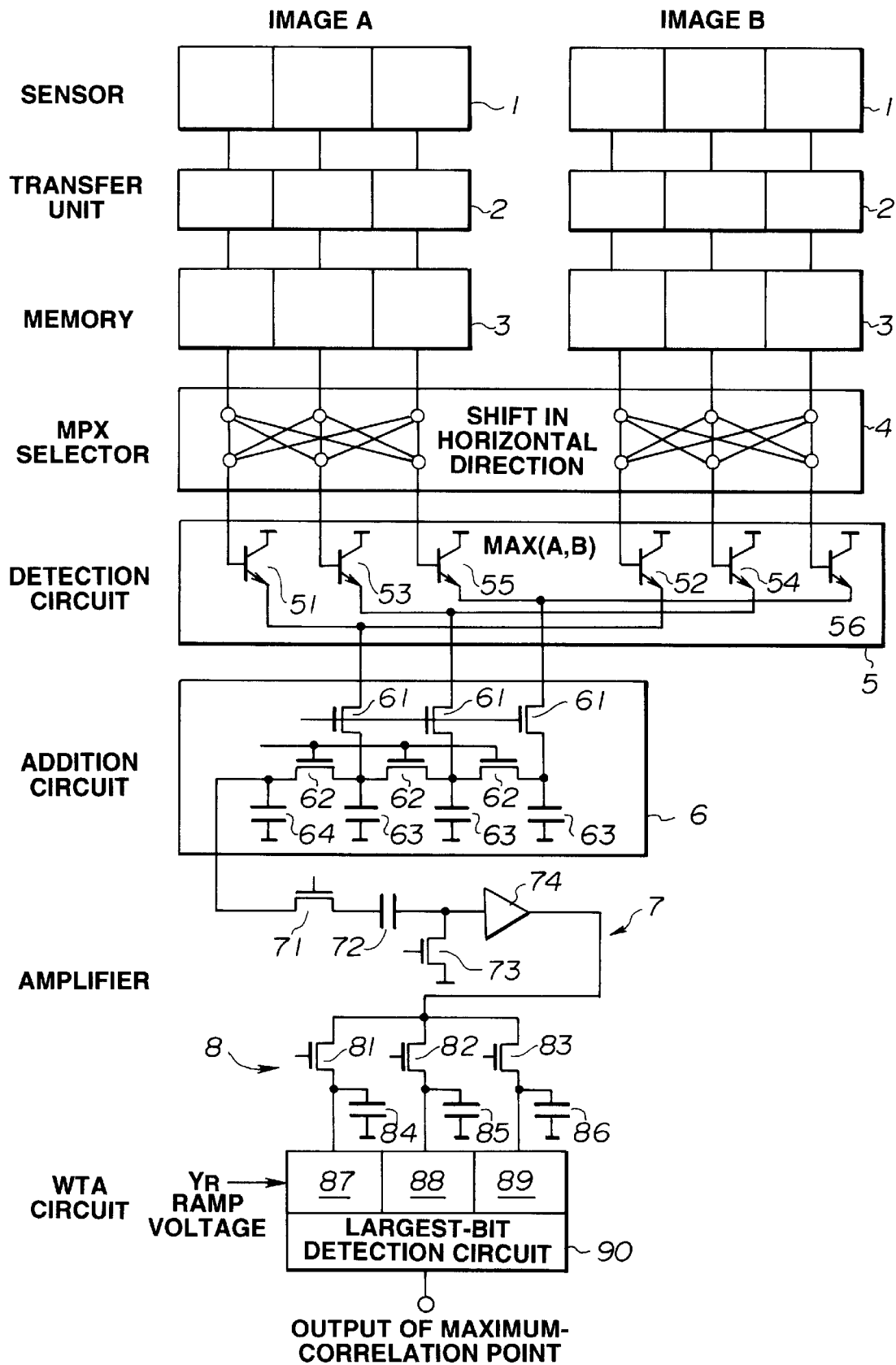
FIG. 9 is a block diagram illustrating the configuration of an image correlator according to a third embodiment of the present invention.

FIG. 9 is a block diagram illustrating an image correlator according to a third embodiment of the present invention. In FIG. 9, reference numeral 1 represents sensors, serving as signal sources, each comprising a plurality of photoelectric transducers for sensing light and converting the light into an electric signal. Transfer units 2 are provided if necessary, and transfer image signals from the sensors 1 directly or by removing noise components. Each of memories 3 includes memory cells whose number equals the number of elements of the sensors 1. The memories 3 temporarily store the image signals transferred from the transfer units 2. A multiplex (hereinafter abbreviated as "MPX") selectors 4, serving as changing means (selection switches), outputs the image signal from the corresponding memory 3 by shifting it in the horizontal direction, for example, by one element (one cell), two elements (two cells) or the like, or outputs the image signal of a specific portion of a frame by one frame or two frames when obtaining correlation in the vertical direction. A detection circuit 5 outputs a peak signal for respective outputs of object pixels of the MPX selector 40 An addition circuit 6 adds the outputs of the detection circuit 5 and outputs the obtained result. An amplifier 7 shifts the output of the addition circuit 6 to a level most suitable for a winner-take-all circuit (hereinafter abbreviated as a "WTA circuit" 8 provided at the next stage. The WTA circuit 8 outputs a so-called winner-take-all output level.

A description will now be provided of the respective blocks. The circuitry of the sensor 1 is the same as that shown in FIG. 2. The operation of the circuitry is the same as that described in the first embodiment. A plurality of one-dimensionally or two-dimensionally arranged photodiodes are used for each of the sensors 1. Several tens of thousands or more of photodiodes are used for a high-resolution sensor.

In the third embodiment, pixel signals are sequentially read for each line from the photodiodes 11 arranged one-dimensionally or two-dimensionally for the images A and B, and are output to the transfer circuit 2, and signals are compared for respective pairs of pixels.

The transfer circuit 2 is the same as that used in the first embodiment.

The same configuration as in the first embodiment is adopted for the memories 3.

The same configuration as in the first embodiment is adopted for the MPX selector 4.

The same configuration as in the first embodiment is adopted for the detection circuit 5. This circuit outputs a peak value for each pair of pixels of right and left images. If correlation between the images is 100%, the output levels of the respective pairs of pixels coincide. If there is no correlation between the images, the output of a larger level from among the two outputs is obtained. For example, charges corresponding to a signal having a higher emitter output voltage level from among the outputs of npn transistors 51 and 52 are stored in a capacitor provided at the next stage. Similarly as for pairs of npn transistors 53 and 54, and 55 and 56, charges corresponding to signals having higher emitter output voltage levels are stored in the capacitor 63.

The same configuration as in the first embodiment are adopted for the addition circuit 6.

The addition circuit 6 stores charges corresponding to a peak value of a pair of pixels in the corresponding capacitor, and thereafter stores the sum of charges stored in the respective capacitors in an addition capacitor 64. More specifically, after detecting the peak value of a pair of pixels, the value for each pair of pixels is stored in the corresponding capacitor 63 by turning on a MOS switching transistor 61. Then, the sum of charges stored in the capacitors 63 are stored in an addition capacitor 64 by turning on corresponding addition MOS transistors 62. Functionally, the capacitor 63, serving as a low-impedance analog memory, is charged. If the capacitance of the capacitor 63 is represented by C, and the voltages of the respective capacitors 63 are represented by V1, V2 and V3, the voltage V stored in the addition capacitor 64 is expressed by:

$$V=(CV1+CV2+CV3)/(C+3C).$$

As a result, the mean value of the voltages of the capacitors 63 is stored in the addition capacitor 64.

The same configuration as in the first embodiment is adopted for the amplifier 7. The addition output stored in the addition capacitor 64 of the addition circuit 6 is output by turning on a switching MOS transistor 71, for example, at each timing of an output obtained by shifting the output of each pixel. The addition output is input to an amplifier 74 in a state in which DC offset is removed by a coupling capacitor (clamping capacitance) 72 for cutting off a DC component. The level of the addition output is shifted in accordance with a reset voltage of an input terminal of an amplifier 74 reset by a reset MOS transistor 73, and the addition output is amplified by the amplifier 74 with a predetermined gain so as to be able to maintain the accuracy of a MOS transistor provided at the next stage.

The WTA circuit 8 sequentially turns on switching MOS transistors 81–83 at every timing of an output obtained by sequentially shifting the signal by a cell, and sequentially stores the outputs of the switching MOS transistors 81–83 at respective timings in time-serial latch capacitors 84–86, respectively. The position where the minimum value of the outputs is output as the position of maximum correlation between the right and left images.

In the third embodiment, also, the above-described υMOS transistors can be used in the addition circuit 6, the WTA circuit 8 or other small-scale high-speed analog-to-digital conversion circuit. It is thereby possible to achive space saving of each circuit, and to easily obtain, for example, results of high-speed calculation, or calculation of maximum and minimum values.

Figure 10:
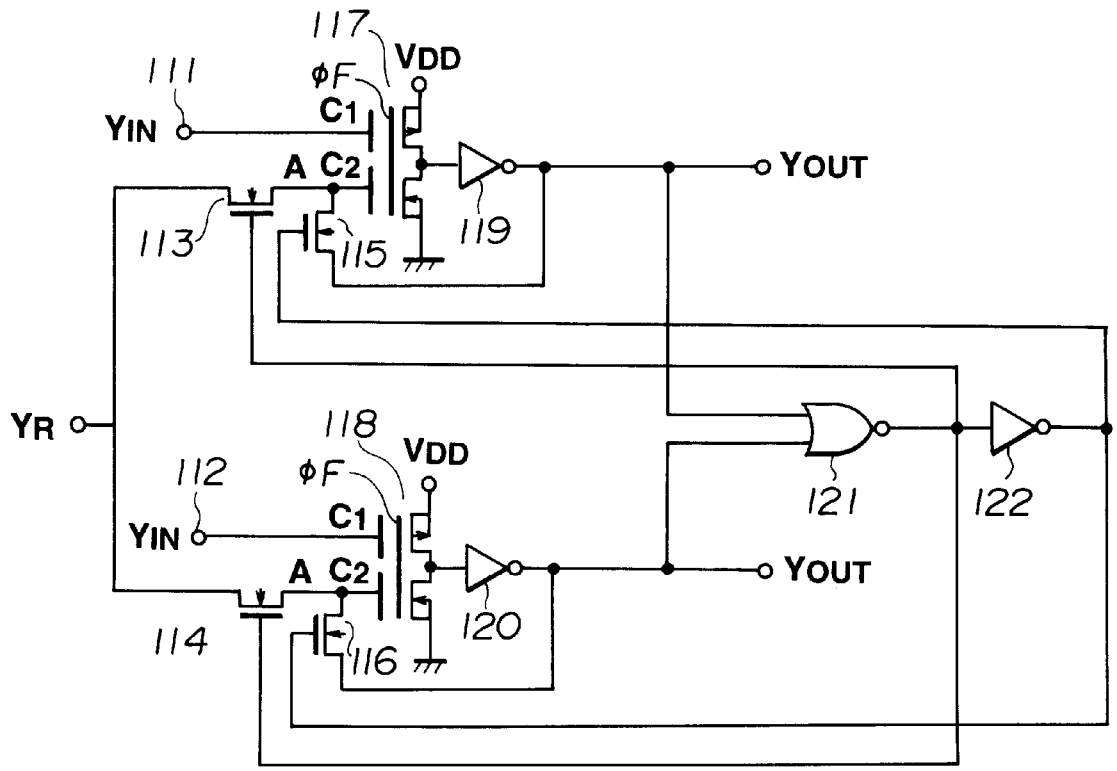
FIG. 10 is a circuit diagram illustrating a specific example of a two-input WTA (winner-take-all) circuit shown in FIG. 9.

FIG. 10 is a circuit diagram illustrating the WTA circuit 8, having two input terminals, for detecting voltage ramp-up. When a ramp pulse voltage is applied to a ramp-up input terminal $Y_R$, only an output terminal OUT indicating the maximum voltage at input terminals $Y_{IN}$ at that time assumes a high level, and another output terminal assumes a low level. That is, in FIG. 10, latch voltages are input to input terminals $Y_{IN}$ 111 and 112 from time-serial latch capacitors 84–86, and to respective capacitors C1 formed according to a CMOS process. The outputs of so-called υMOS inverters 117 and 118 formed according to a CMOS process are input to sense-amplifier inverters 119 and 120, respectively. The outputs of the sense-amplifier inverters 119 and 120 are transferred to respective outputs $Y_{OUT}$ and to a NAND circuit 121. The output of the NAND circuit 121 is connected to the gates of ramp switching MOS transistors 113 and 114, and to an input terminal of an inverter 122. The output of the inverter 122 is input to the gates of switching MOS transistors 115 and 116 for opening/closing a loop for performing feedback of the outputs of the υMOS inverters 117 and 118, respectively.

Figure 11:
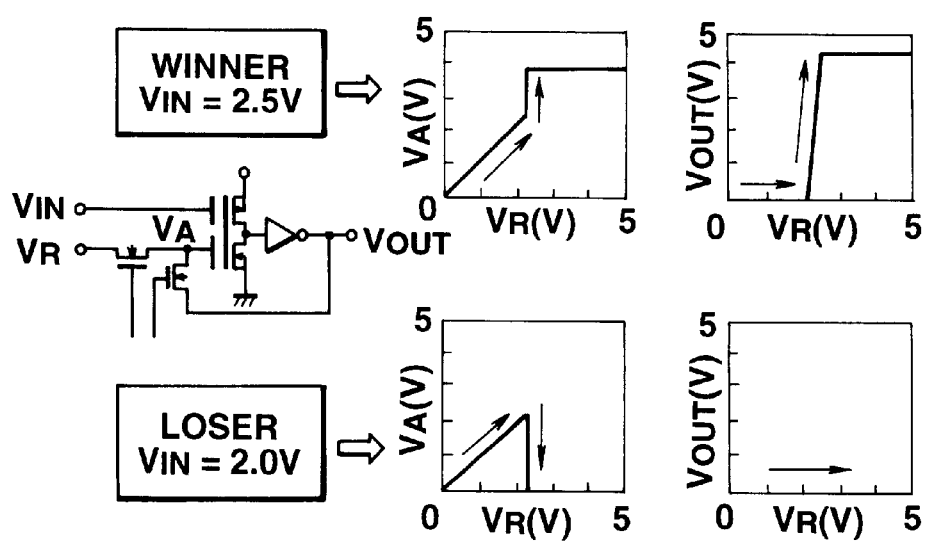
FIG. 11 is a schematic diagram illustrating the operation of the WTA circuit shown in FIG. 10.

When a gradually increasing ramp voltage is input, as shown in FIG. 11, the output of a υMOS inverter having a higher input voltage $V_{IN}$ assumes a high level, and the output of a υMOS inverter having a low input voltage is thereby maintained at a low level. By thus configuring the WTA circuit 8 by υMOS inverters, the position having a maximum value corresponding to a high degree of correlation can be easily detected by a single voltage ramp-up operation.

Figure 12:
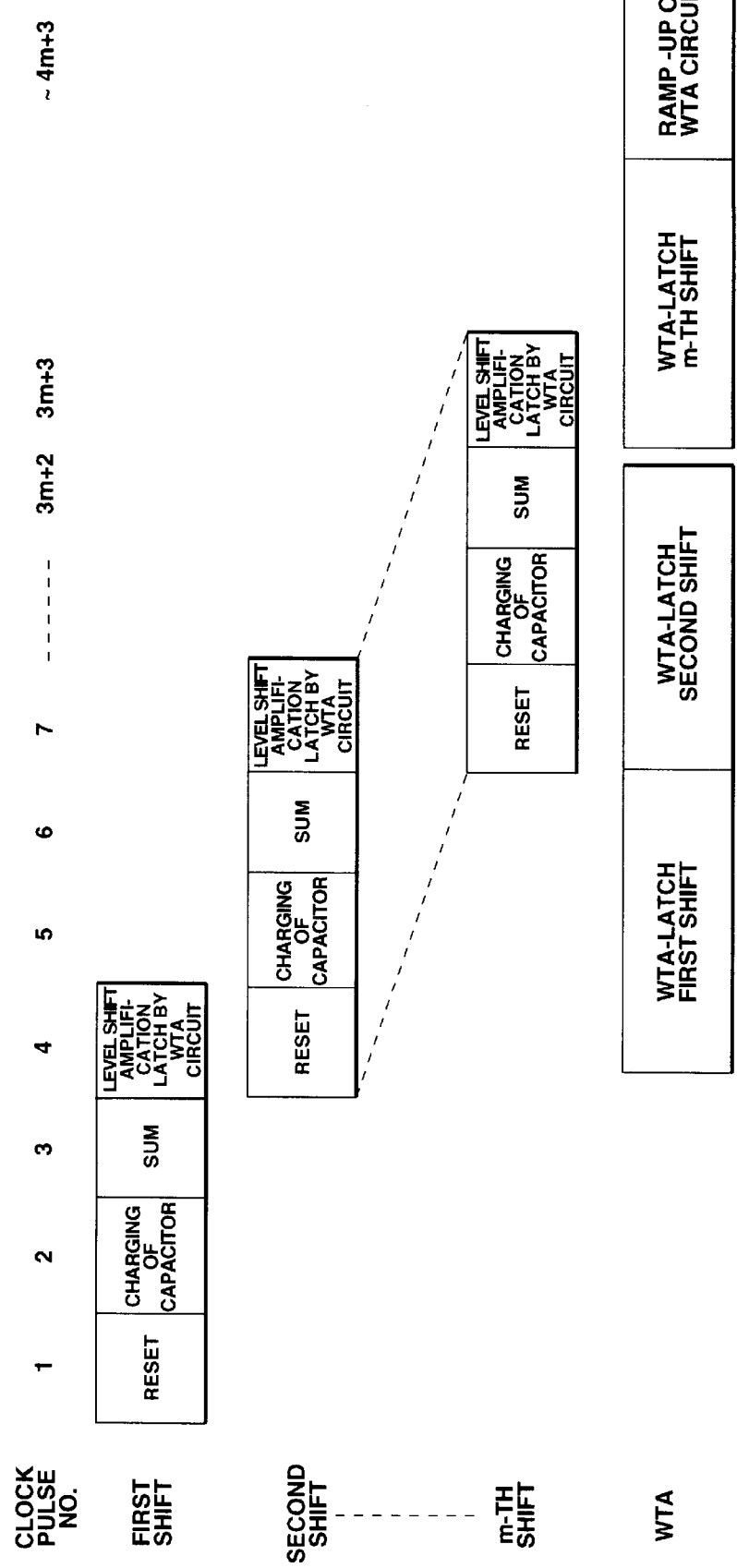
FIG. 12 is a timing chart of the image correlator shown in FIG. 9.

A method for driving a high-precision input-image correlator will now be described in more detail with reference to FIG. 12. For clock pulse Nos. 1, 2, . . . 3m+2, 3m+3, . . . , 4m+3, In a first shift, reset is performed at the first clock pulse. At the second clock pulse, the drive of the MPX selector 4, peak detection, and charging of the capacitor of the addition circuit are performed. The result of addition is charged in the addition capacitor at the third clock pulse. At the fourth clock pulse, a level shift, an amplification operation and latch by the WTA circuit 8 are performed. Thus, a signal is sequentially shifted by four clock pulses. At the second shift, latch by the WTA circuit 8 is performed by being delayed by two clock pulses from the end of latch by the WTA circuit 8 at the first shift, and a signal is latched by the WTA circuit 8 by being delayed by three clock pulses. After latching all pixels, a WTA ramp-up operation by the WTA circuit 8 is performed, and a shift position indicating the maximum value is output. Thus, the shift position indicating maximum correlation is obtained.

Figure 13A:
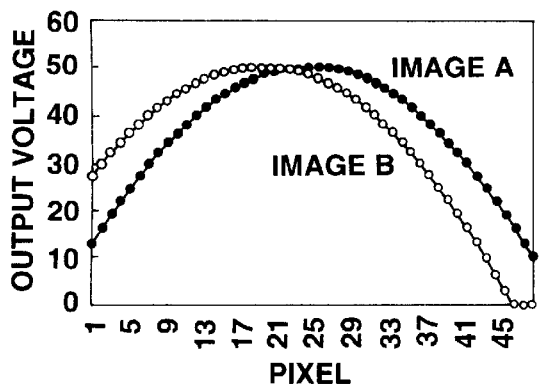
FIGS. 13(A)–13(E) are diagrams illustrating the states of respective units of the image correlator shown in FIG. 9.
Figure 13B:
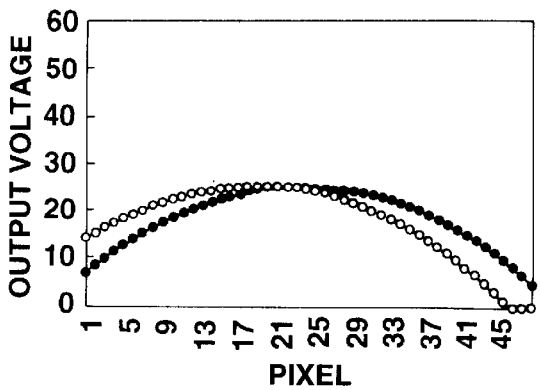
Figure 13C:
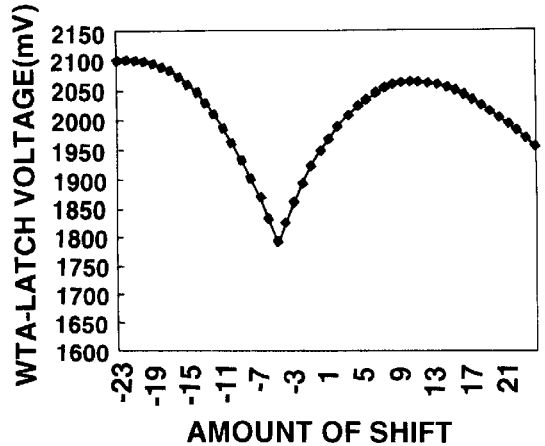
Figure 13D:
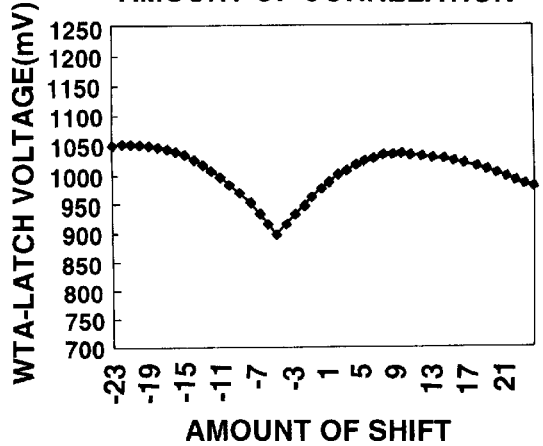
Figure 13E:
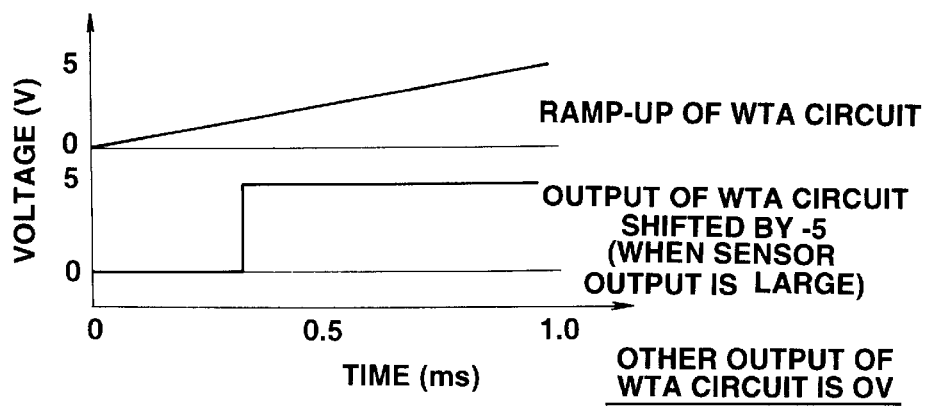

FIGS. 13(A)–13(E) show the states of respective blocks. In this case, the right and left images to be compared shift by −5 pixels, and a −5-pixel shift position is a position indicating the maximum correlation value. FIG. 13(A) illustrates the outputs of memory cells. The abscissa represents pixels comprising 48 bits, and the ordinate represents the output voltage. FIG. 13(B) illustrates a case of a small input amount of light. In FIG. 13(C), the abscissa represents the amount of shift in which the pixels comprising 48 bits are divided into plus and minus portions, and the ordinate represents the WTA-latch voltage. FIG. 13(C) indicates that an image corresponding to the amount of shift of −5 bits where the WTA latch voltage has a minimum value has highest correlation. FIG. 13(D) illustrates a cases in which the level of the WTA latch voltage is low because the amount of light is small. FIG. 13(E) time-serially illustrates the state of the WTA output shifted by −5 bits relative to ramp-up of the WTA circuit. Another output of the WTA circuit remains at a low level.

An image comparator is used for achieving the function of a part of the image correlator. The combination of the MPX selector 4, the detection circuit 5, the addition circuit 5, the amplifier 7 and the WTA circuit 8 can compare right and left images and detect the degree of correlation between the two images. Particularly, by manufacturing these components according to the same semiconductor-device manufacturing process, a small and high-speed image comparator can be provided.

In this image correlator, by replacing the npn transistors of the detection circuit 5 by pnp transistors, a signal representing a minimum value for each pair of pixels is detected as the amount of correlation between the images A and B. In this case, by detecting a maximum value by the WTA circuit, the same correlation calculation as that described above can be performed, and the, amount of shift indicating the maximum value corresponds to a point of largest correlation.

If a maximum-value detection circuit for detecting a peak signal for each pair of pixels and a minimum-value detection circuit for detecting a minimum value for each pair of pixels are provided in parallel in the detection circuit 5, and the sum of maximum values and the sum of minimum values are obtained for each amount of shift and the difference between the sums is obtained, the difference corresponds to a variance in the absolute value as the amount of correlation between the images A and B. At that time, by detecting the minimum value in the vicinity of the ramp voltage $V_R$ by the WTA circuit, the same correlation calculation as that described above can be performed.

Fourth Embodiment

A description will now be provided of an AF sensor for automatically performing focusing in a silver-chloride or silver-halide-film camera, a video camera or the like using the above-described image correlator of the third embodiment, according to a fourth embodiment of the present invention, with reference to FIGS. 7 and 8.

In FIG. 7, light reflected from the object 49 to be focused reaches the sensors 41 after passing through the main lens 48, the main mirror 45, the sub-mirror 44, the field lens 43 and the spectacle lens 42. The light sensed by each of the sensors 41 is subjected to photoelectric conversion, and an output signal is transmitted to the microprocessor 46. When the object 49 is out of focus, an operation of again reading the image is performed by driving a motor 47. This operation is repeated until the object 49 is in focus. FIG. 8 illustrate the pathes of the light beam and sensor outputs when the main lens 48 fucuses the object on a focus plane, in front of the focus plane, and behind the focus plane. When the levels of the outputs of the two sensors 41 have a maximum value, it is determined that a focus state is obtained. In this case, using the above-described image correlator, for example, the outputs of respective pixels of the sensor for the image A are made to be reference, and correlation between the images A and B are obtained by sequentially shifting the outputs of respective pixels of the sensor for the image B by one pixel. If the amount of shift of correlation relative to the arrangement of the two sensors equals predetermined bits (pixels), and the amount of shift where the highest degree of correlation is obtained coincides with the predetermined bits, it is determined a focus state is obtained. For example, in the case of focus ahead, the correlation peak is less than the predetermined bits. Hence, an instruction to move the main lens 48 backward is transmitted from the microprocessor 46 to the motor 47. This operation is continued until it is determined that a focus state is provided. At that time, since the above-described image corrrelator is used, bits of the shift of the image can be precisely detected at a high speed. In addition, since the burden on the microprocessor 46 is weakened, the processing capability of the microprocessor 46 can be used for other functions.

As described above, the image comparator or the image correlator of the present invention can calculate and output the amount of shift of pixels where correlation between two images has a maximum value using an on-chip image sensor, and can achieve very precise correlation calculation with a small circuit scale by time serially shifting pixels.

By using the image correlator in an AF sensor, it is possible to obtain precise image correlation at a high speed and to detect an autofocus point while reducing the load of a microprocessor mounted in a camera.

Fifth Embodiment

Next, a signal adder according to a fifth embodiment of the present invention will be described. The fifth embodiment particularly relates to an analog-signal adder having a large number of input terminals and capable of adding a large number of analog signals at a time, and to an image correlator using such an adder.

As described above, the conventional analog-signal adder uses an operational amplifier in which signals are input to a low-impedance common terminal via respective resistors from respective input terminals, and the common terminal is used as one input terminal. If a fixed voltage is supplied to another input terminal of the operational amplifier, the gain of the operational amplifier is made constant depending on the values of the resistors connected to the respective input terminals. Accordingly, it is possible to provide predetermined weighting for input voltages supplied to the respective input terminals.

However, since the addition circuit using the operational amplifier has a large area, it is difficult to form the addition circuit, particularly, on a substrate including digital and analog circuits. Furthermore, a space for connecting analog circuits to digital circuits is also required in addition to an area occupied by the operational amplifier.

The adder of the fifth embodiment includes a plurality of first semiconductor layers for individually inputting analog signals, first gates partially overlapped with the plurality of first semiconductor layers, a plurality of second gates partially overlapped with the first gates, a third gate partially overlapped with the plurality of second gates, and a second semiconductor layer partially overlapped with the third gate.

In the above-described analog-signal adder, the first semiconductor layer and the second semiconductor layer are formed by introducing impurities within a semiconductor substrate. The first gates and the third gate include polysilicon formed on the semiconductor substrate via an insulator. The second gates are formed on portions of the first gates and the third gate using polysilicon or the like.

Figure 14A:
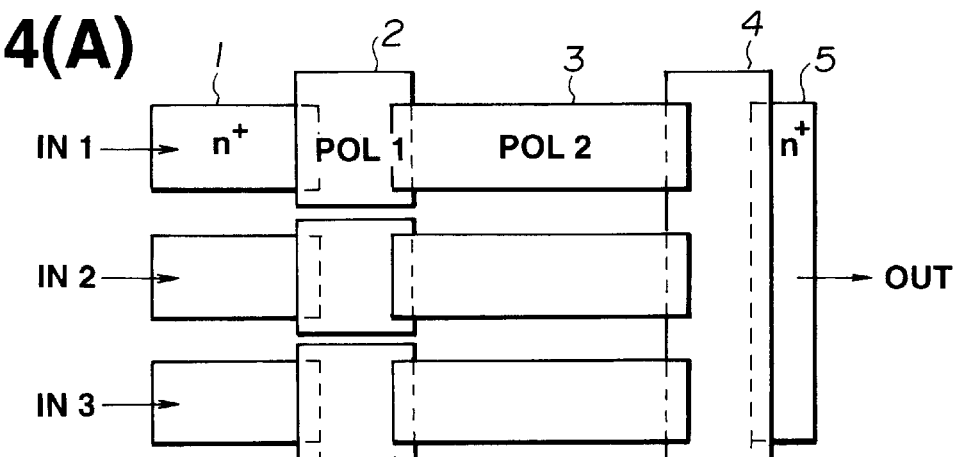
FIGS. 14(A) and 14(B) are diagrams illustrating the structure of a signal adder according to a fifth embodiment of the present invention.
Figure 14B:
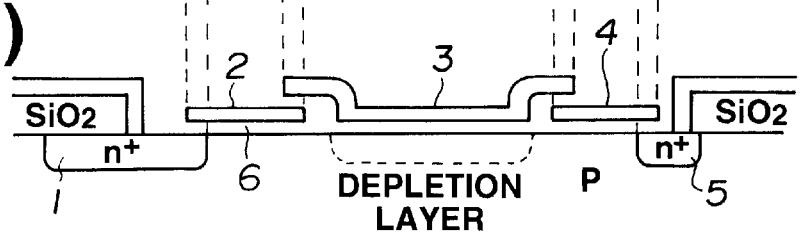

FIGS. 14(A) and 14(B) illustrate the principal structure of the analog-signal adder of the fifth embodiments FIG. 14(A) illustrates a cross-sectional view of the analog-signal adder, and FIG. 14(B) illustrates an equivalent circuit diagram of the analog-signal adder.

Figure 15:
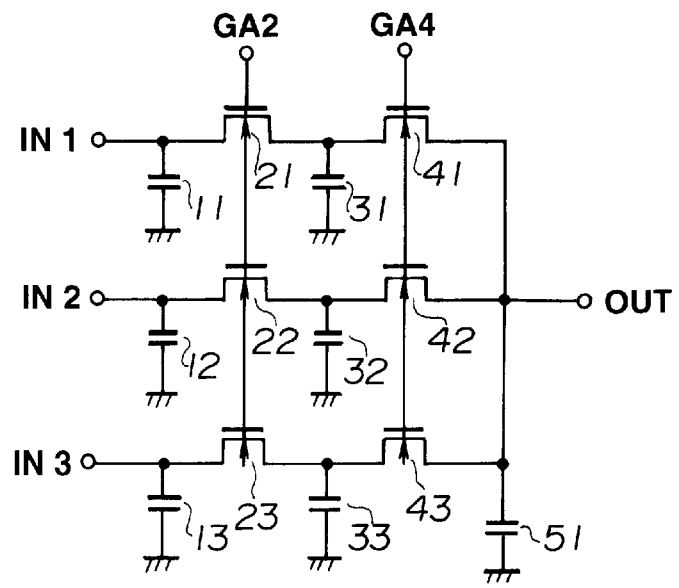
FIG. 15 is an equivalent circuit diagram of the signal adder shown in FIGS. 14(A) and 14(B)

In FIGS. 14(A) and 14(B), a semiconductor layer 1 is formed by introducing an n-type impurity in a substrate by ion implantation and/or diffusion. The semiconductor layer 1 is an n⁺ layer, and is in ohmic contact with connection lines for supplying input voltages to input terminals IN1–IN3. Capacitors 11–13 are equivalently present between the semiconductor layer 1 and a p-type silicon subtrate, serving as the substrate (see FIG. 15). Each of the capacitors 11–13 has, for example, a capacitance of about 1 pF. First polysilicon gates 2, for example, doped with boron are formed in a state of being partially superposed on an end portion of the semiconductor layer 1 via an insulating layer 6. The gates 2 serves as the gates of equivalently formed n-type MOS transistors 21–23. Second polysilicon gates 3 are overlapped with end portions of the first polysilicon gates 2 via the insulating layer 6. The gates 3 equivalently form capacitors 31–33 (see FIG. 15). A depletion layer or an inversion layer is formed under the layer of the second polysilicon gates 3. The thickness of the depletion layer is determined by the doner density within the p-type silicon substrate. A third polysilicon gate 4 is formed in a state of being partially overlapped under end portions of the second polysilicon gates 3, and serves as a common gate for the three second polysilicon gates 3. The gate 4 equivalently serves as the gates of n-type MOS transistors 41–43. A second semiconductor layer 5 is formed in a state of being partially overlapped under an end portion of the third polysilicon gate 4 via the insulating film 6. The layer 5 is formed by introducing an n-type impurity in the p-type silicon substrate, and equivalently forms as a capacitor 51.

It is possible to modify the structure of the adder, so that end portions of each gate 3 are disposed beneath the end portions of the gate 2 and the gate 4.

An n-type layer having a thickness of 0.05 to 0.4 um and impurity concentration of $10^{16}$ to $10^{18}/cm^3$ may be employed to replace the depletion layer.

FIGS. 16(A)–16(C) are schematic diagrams illustrating energy levels in the analog-signal adder of the fifth embodiment. FIG. 16(A) illustrates a state in which the first and third polysilicon gates GA2 and GA4 assume a low level, and a voltage is applied to one of input terminals IN1–IN3 to store charges in the corresponding one of the capacitors 11–13. A high energy level of the capacitor $C_{51}$ indicates a reset potential.

If the potential of the gate GA2 is made to be a high level, the state shown in FIG. 16(B) is provided, in which charges stored in the capacitor $C_{12}$ are distributed to the capacitors $C_{12}$ and $C_{32}$ to equalize the energy level. At that time, if the initial potential of the capacitor $C_{12}$ is represented by $V_0$, the equalized potential is expressed by:

$$C_{12}V_0/(C_{12}+C_{32}) \qquad (1).$$

Thus, charges of the input signal are transferred from the first semiconductor layer 1 to the second polysilicon gate 3 by being divided between the capacity of the first semiconductor layer 1 and the second polysilicon gate 3.

Then, if the potential of the gate GA3 is made to be a low level, and the potential of the gate GA4 is made to be a high level, the state shown in FIG. 16(C) is provided. This potential is added to the reset potential, and charges are transferred to the capacitor $C_{51}$. At that time, the potential of the capacitor $C_{51}$ has a value obtained by adding the following potential to the reset potential:

$$C_{12}C_{32}V_0/(C_{12}+C_{32}).C_{51} \qquad (2).$$

Thus, the input applied voltage is output at a charge level. A potential applied to another input terminal is sequentially added at a charge level from the first semiconductor layer 1 via the polysilicon layer in the second semiconductor layer 5, serving as a common terminal, and the following charge potential appears in the equivalent capacitor $C_{51}$:

$$[(C_{11}C_{31}V_1)/\{C_{11}+C_{31}).C_{51}\}]+$$
$$[C_{12}C_{32}V_2)/\{C_{12}+C_{32}).C_{51}\}]+$$
$$[C_{13}C_{33}V_3)/\{C_{13}+C_{33}).C_{51}\}] \qquad (3),$$

where V1–V3 are voltages applied to the respective input terminals, and an output by adding this potential to the reset potential is obtained. As shown in FIG. 16(C), signal charges stored in the capacitors 31–33 of the second polysilicon gates 3 can be completely transferred to the capacitor 51 of the second semiconductor layer 5.

Although in the fifth embodiment, the case of three inputs has been illustrated, addition for obtaining the sum of applied input voltages can be performed also in a case of providing four or more input terminals. In the above-described expression (3), according to autoalignment in a MOS manufacturing process, the states of $C_{11}=C_{12}=C_{13}$, and $C_{31}=C_{32}=C_{33}$ are substantially obtained.

By making $C_{11}$ (=$C_{12}=C_{13}$) smaller than $C_{31}$ (=$C_{32}=C_{33}$), and making $C_{31}$ greater than $C_{51}$, the addition gain can be greater than 1. For example, if $C_{11}:C_{31}:C_{51}=1:2:0.5$, the addition gain becomes 4/3 according to expression (3).

In the above-described addition circuit, the case of making electrons a main carrier using an no layer as the semiconductor layer has been shown. When making holes a main carrier, a p⁺ layer may be formed in an n-type substrate or a substrate having an n-type semiconductor layer.

A process for integrating the analog addition circuit may comprise an ordinary wafer process and a test and packaging process. The wafer process comprises component separation, formation of gates, sources and drains, and formation of interconnection. Particulary in gate formation, the structure shown in FIG. 14(B) can be obtained by repeating an ordinary gate formation process twice.

More specifically, a silicon substrate is selectively oxided using a desired pattern to form a field insulating film. Then, a gate insulating film is formed according to thermal oxidation. Then, a doped polysilicon layer is formed, and the first polysilicon gates 2 and the third polysilicon gate 4 are formed by patterning. Then, after forming an insulating film according to thermal oxidation a doped polysilicon layer is again formed, and the second polysilicon gates 3 are formed by patterning. Then, the semiconductor layers 1 and 5 are formed by ion implantation. Thus, the components of the addition circuit of the fifth embodiment are formed.

Sixth Embodiment

Figure 17:
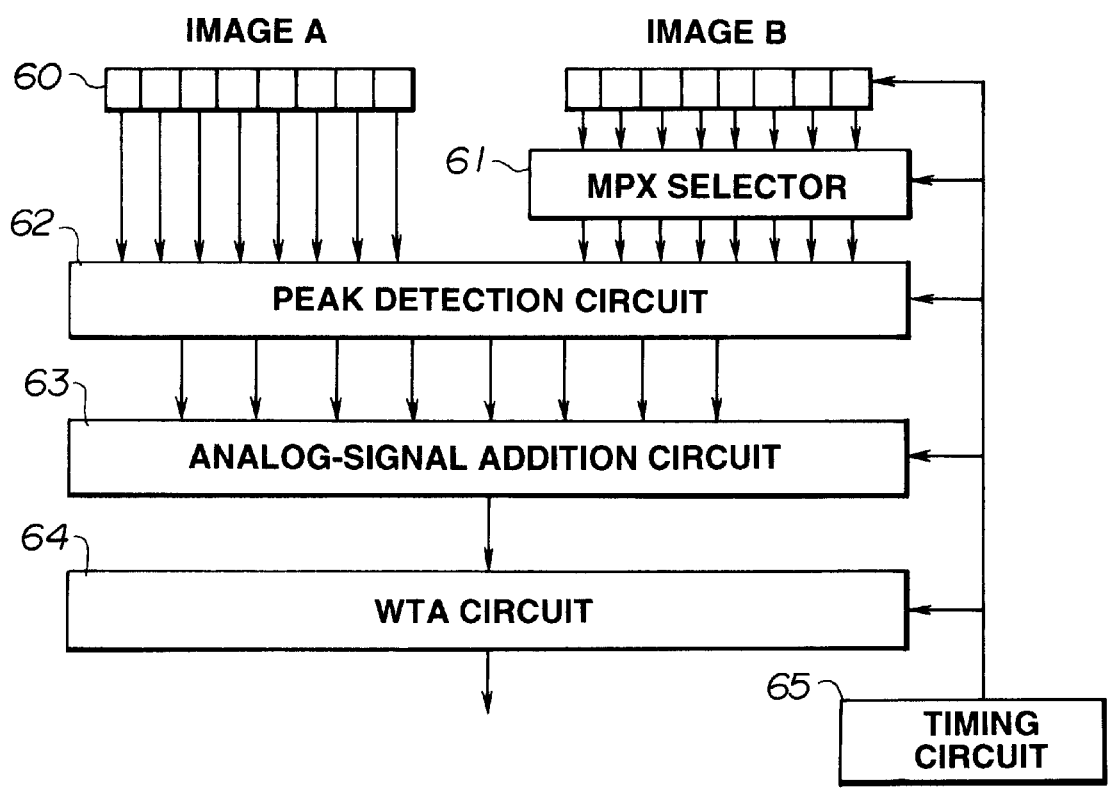
FIG. 17 is a block diagram illustrating an image correlator using an analog-signal adder according to a sixth embodiment of the present invention.

FIG. 17 is a block diagram illustrating an image correlator. In FIG. 17, reference numeral 60 represent line image memories 60 for images A and B. A plurality of photoelectric transducers may be provided at at least one of the memories 60. As the image A, an image to be compared and correlated is written, and signal charges are stored in corresponding memory elements for respective pixels. As the image B, signal charges for a reference image are stored in corresponding memory elements for respective pixels. For correlation between still images, a reference image is stored in advance. In the case of a moving image, an image at a time different from that of the image A is stored. An HPX selector 61 sequentially outputs a signal being shifted by one pixel, or by two pixels or three pixels in some cases, relative to an input pixel signal. At that time, when obtaining correlation for each line, the HPX selector 61 may be provided for one of the images A and B, and when obtaining correlation between area images in a two-dimensional space, the HPX selector 61 may be provided for each of the images A and B. A peak detection circuit 62 detects a peak value of respective pixels of the image A and an image obtained by shifting the image B by predetermined pixels. In this case, two pixel levels are compared, and a higher pixel level is output.

Reference numeral 63 represents an analog-signal addition circuit. The analog addition circuit described in the fifth embodiment can be used as the analog-signal addition circuit 63. This circuit adds peak values of respective pixel values detected by the peak detection circuit 62, and outputs an image signal representing the sum of the peak values. Reference numeral 64 represents a WTA circuit disclosed in Japanese Patent Laid-Open Application (Kokai) No. 6-53431 (1994). The WTA circuit 64 receives the sum of image signals for respective images shifted by the MPX circuit 61, and detects the point of image shift corresponding to the maximum value of the sum of the image signals. The point of image shift having the maximum value (the minimum value) corresponds to highest correlation between the images A and B.

In this image correlator, the image memories 60, the MPX circuit 61, the peak detection circuit 62, the analog-signal addition circuit 63 and the WTA circuit 64 can be manufactured on a single chip. Particularly by forming these components according to a process which is compatible with a CMOS process, a small-scale reliable devices having a high processing speed can be obtained at a low cost. Particularly, the analog-signal addition circuit 63 need not have a large-scale configuration even if the number of pixels constituting the image memory is 256 or more, and can obtain an addition output value by supplying the gate with about two control clock pulses.

In the sixth embodiment, a description has been provided illustrating a case of using a WTA circuit for detecting the maximun value (the minimum value) of image correlation. However, in order to detect a more precise maximum correlation value, the maximum value of a pixel of an image obtained by shifting a target image and the corresponding pixel of a reference image may be detected, the difference between the maximum values of adjacent pixels may be obtained, the sum of the differences of the entire images may be plotted with respect to the amount of shift, and a zero-cross point may be detected using a ZCD circuit. The WTA circuit and the ZCD circuit have been described above.

A description will now be provided of the ZCD circuit with reference to FIG. 4 described above. FIG. 4 is a diagram illustrating the ZCD circuit having four input terminals for detecting a zero-cross point. The zero-cross point indicates the amount of shift of pixels between the object image and the reference image, and the point of pixels corresponding to the amount of shift indicates the position of maximum correlation. In FIG. 4, reference numerals 21–24 represent so-called υMOS transistors having two input gates. Input terminals VI–V4 and a reset terminal VR are connected to the corresponding gates Reset MOS transistors 25–28 reset the potentials of corresponding floating gates of the υMOS transistors 21–24 by turning on/off the υMOS transistors 21–24, respectively. Inverters 31–34 invert the outputs of the υMOS transistors 21–24, respectively. NAND circuits 35–37 receive the outputs of the corresponding adjacent inverters.

It is assumed that input voltages at the respective input terminals have the relationship of V1>V2>VR>V3>V4. If a potential VR is set to the reset terminal, high-level signals are output to the inverters 31 and 32, low-level signals are output the inverters 33 and 34, and to the NAND circuit 35, a high-level signal is output to the NAND circuit 36, and a low-level signal is output to the NAND circuit 37. Accordingly, the cross point between the VR and the input voltage is detected. By plotting the sum of the differences of the entire images with respect to the amount of shift and detecting the zero-cross point by the ZCD circuit, the point of maximum correlation between the object image and the reference image can be detected.

In this case, the above-described analog-signal adder can be used for the block for outputting the sum of the differences, and it is also possible to provide the analog-signal adder and the ZCD circuit on a single chip.

Although in the sixth embodiment, the case of using an analog-signal adder for an image correlator has been illustrated, the analog-signal adder and the WTA circuit or the ZCD circuit for outputting digital signals can be formed on a substrate having analog and digital circuits formed thereon. An analog-signal adder can generally be used in various ways in a signal processing system, and may be used not only for an image-signal processing circuit but also for other calculation circuits, and therefore, is not limited to the above-described embodiment.

As described above, the analog-signal adder of the present embodiments allows capacity division and charge transfer in a complete depletion layer for an analog input signal, can be manufactured as a small-scale device using a MOS process, and can easily obtain a result of addition by high-speed driving. Furthermore, by using the analog-signal adder in a signal processing circuit, such as an image correlator or the like, and integrally arranging these devices on a semiconductor substrate, a small device having a higher function can be provided.

The individual components shown in outline or designated by blocks in the drawings are all well known in the image correlator, image processing apparatus and signal adder arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A correlator for detecting correlation between a plurality of groups of information signals, said correlator comprising:

combination changing means for changing a combination of cell signals to be compared with each other, the cell signals selected from the croups of information;

detection means for comparing corresponding cell signals of the changed combination of cell signals changed by said combination changing means with each other and detecting a maximum value or a minimum value of the compared cell signals;

calculation means for calculating output signals based on a detection made by said detection means; and comparison means for comparing an obtained result of calculation with a reference signal in accordance with the combination of cell signals determined by said combination changing means.

2. A correlator according to claim 1, wherein said combination changing means comprises a selection switch for shifting an address of at least one of two information signals.

3. A correlator according to claim 1, wherein said combination changing means comprises a multiplex selector.

4. A correlator according to claim 1, wherein said detection means comprises a peak detection circuit.

5. A correlator according to claim 1, wherein said detection means comprises a bottom detection circuit.

6. A correlator according to claim 1, wherein said detection means comprises a circuit for commonly connecting each group of output lines from said combination changing means.

7. A correlator according to claim 1, wherein said detection means comprises a circuit comprising transistors, output lines from said combination changing means being connected to control electrodes of corresponding transistors, and main electrodes of each group of said transistors being commonly connected.

8. A correlator according to claim 1, wherein said calculation means comprises an addition circuit.

9. A correlator according to claim 1, wherein said calculation means comprises a subtraction circuit and an addition circuit.

10. A correlator according to claim 1, wherein said calculation means comprises a device comprising a plurality of control gates connected to a plurality of input terminals, and a floating gate subjected to capacitive coupling with said plurality of control gates.

11. A correlator according to claim 1, wherein said calculation means comprises a group of first semiconductor regions connected to a plurality of input terminals, three gates, and a second semiconductor region connected to an output terminal.

12. A correlator according to claim 1, wherein end portions of adjacent two gates from among said three gates are overlapped with each other.

13. A correlator according to claim 1, wherein said calculation means comprises a zero-cross detection means.

14. A correlator according to claim 1, wherein said comparison means comprises a winner-take-all circuit.

15. A correlator according to claim 1, wherein said comparison means has capacitances for holding results of calculation for a combination of cell signals.

16. A correlator according to claim 1, wherein said plurality of groups of information signals comprise image information.

17. A correlator according to claim 1, wherein said plurality of groups of information signals comprise groups of signals stored in memories for storing signals from signal sources.

18. A correlator according to claim 1, wherein each of said signal sources comprises a photoelectric transducer.

19. A correlator according to claim 1, wherein said correlator comprises a single-chip IC (integrated circuit).

20. A signal adder comprising:

a plurality of first semiconductor layers for individually inputting signals;

a plurality of first gates, each having a first portion that is overlapped with a part of a corresponding one of said plurality of first semiconductor layers and a second portion that is not overlapped with the corresponding one of said plurality of first semiconductor layers;

a plurality of second gates, each overlapped with a part of a corresponding one of said plurality of first gates;

at least one third gate overlapped with a part of said plurality of second gates; and a second semiconductor layer overlapped with a part of said third gate.

21. A signal adder according to claim 20, wherein said second gates are formed on respective end portions of said first gates and said third gate.

22. A signal adder according to claim 20, wherein said first through third gates comprise polysilicon.

23. A signal adder according to claim 22, wherein said polysilicon includes atoms which belong to the group III or the group V of the periodic table.

24. A signal adder according to claim 20, wherein said third gate is formed with a layer which is common to said plurality of second gates.

25. A signal adder according to claim 20, wherein the number of said third gates equals the number of said plurality of second gates.

26. A signal adder according to claim 20, wherein pulse voltages are simultaneously applied to said plurality of first gates.

27. A signal adder according to claim 20, wherein pulse voltages are independently applied to said plurality of third gates.

28. A signal adder according to claim 20, wherein said signal adder is formed according to a CMOS (complementary metal oxide semiconductor) process.

29. A signal adder according to claim 20, wherein said first and second semiconductor layers are formed according to ion implantation process.

30. A signal adder according to claim 20, wherein said first and second semiconductor layers, and said first and third gates are self-aligned, respectively.

31. A signal adder according to claim 20, wherein said signal adder comprises photoelectric transducers, each comprising insulating-gate-type transistors.

32. A signal adder according to claim 20, wherein said photoelectric transducer comprises a nondestructive-reading device.

33. An image correlator for detecting correlation between a plurality of images, said image correlator comprising:

a plurality of memories, each for storing a corresponding one of the plurality of images;

a selection switch for shifting addresses of said plurality of memories;

a detection circuit for detecting a maximum value or a minimum value of a signal of each memory cell of one of said plurality of memories and a signal of each memory cell having a shifted address of another memory; and an adjacent-output-difference output circuit for outputting the difference between adjacent outputs from among outputs for respective pixels of said detection circuit.

34. An image correlator according to claim 33, further comprising:

capacitors each for storing a corresponding difference output from said adjacent-output-difference output circuit;

an adder for adding the respective differences;

an amplifier for clamping and amplifying an output of said adder;

a time-serial latch circuit for latching an output of said amplifier for each shift; and a detection circuit for detecting a desired output voltage from among outputs of said time-serial latch circuit.

35. An image processing circuit comprising:

first and second image memories, each comprising a plurality of memory cells for storing signals corresponding to images;

a multiplex selector for reading a signal from each of the memory cells of said first image memory and for shifting the read signal by a predetermined number of pixels;

detection means for comparing the signal of a memory cell of said first image memory and the signal of a memory cell of said second image memory with each other and for detecting a maximum value or a minimum value of the signals; and adjacent-value-difference output means for obtaining the difference between a maximum value or a minimum value of the memory cell and a maximum value or a minimum value of an adjacent memory cell.

36. An image processing circuit according to claim 35, further comprising:

addition means for adding the differences of said adjacent-value-difference output means for the number of the memory cells;

time-serial latch means for latching the output of said addition means for each shift; and detection means for detecting a desired output voltage from among outputs of said time-serial latch means.

37. An image processing circuit according to claim 35, wherein the desired output voltage is a voltage which performs zero crossing relative to an amount of shift.

38. An autofocus camera which uses said image correlator according to claim 34.

39. An autofocus camera which uses said image processing circuit according to claim 36.

40. An image correlator for detecting correlation between a plurality of images, said image correlator comprising:

a plurality of memories, each for storing a corresponding one of the plurality of images;

a selection switch for shifting addresses of said plurality of memories; and detection means for comparing a signal stored in each memory cell of one of said memories and a signal stored in a memory cell having a shifted address of another memory with each other and for outputting a signal stored in one of the memory cells, said detection means detecting a maximum value or a minimum value of the compared cell signals.

41. An image correlator according to claim 40, further comprising determination means for determining an amount of shift where the output of said comparison means has a maximum value or a minimum value from among amounts of shift.

42. An image correlator according to claim 41, wherein a winner-take-all circuit is used for said determination means.

43. An image correlator according to claim 42, wherein said winner-take-all circuit comprises capacitors, each connected to a corresponding one of multiple input terminals, and MOS transistors, each connected to a sense amplifier making said capacitors common terminals.

44. An image correlator for detecting correlation between a plurality of images, said image correlator comprising:

memories for storing the plurality of images;

a multiplex selector for shifting the outputs of said memories;

correlation means for comparing the output of one of said memories with a shifted output, and for taking out a result of comparison for each amount of shift; and determination means for determining an amount of shift where the output of said correlation means has a maximum value, said determination means detecting a maximum value or a minimum value of the compared cell signals and performing its determination accordingly.

45. An image correlator according to claim 44, wherein a winner-take-all circuit is used for said determination means, and wherein said winner-take-all circuit comprises capacitors, each connected to a corresponding one of multiple input terminals, and υMOS transistors, each connected to a sense amplifier making said capacitors common terminals.

46. An image processing apparatus for determining an amount of difference between a predetermined image and a separately provided image by detecting a degree of correlation between the images, said apparatus comprising:

a plurality of laterally disposed first photoelectric transducers for reading the predetermined image;

a plurality of laterally disposed second photoelectric transducers for reading the separately provided image;

first memories corresponding to said plurality of first photoelectric transducers for sequentially storing outputs of said first photoelectric transducers in a longitudinal direction;

second memories corresponding to said plurality of second photoelectric transducers for sequentially storing outputs of said second photoelectric transducers in a longitudinal direction;

a multiplex selector for shifting the outputs of said second memories in the lateral direction for the longitudinal direction;

correlation means for obtaining correlation between the outputs of said first memories and the outputs of said second memories taken out for every amount of shift in the lateral direction; and determination means for determining an amount of shift where the output of said correlation means has a maximum value.

47. An apparatus according to claim 46, wherein a winner-take-all circuit is used for said correlation means and said determination means, and wherein said winner-take-all circuit comprises capacitors, each connected to a corresponding one of multiple input terminals, and υMOS transistors connected to a sense amplifier making said capacitors common terminals.

48. An autofocus camera which uses said image correlator according to claim 42.

49. An autofocus camera which uses said image processing apparatus according to claim 46.

50. The signal adder according to claim 20, wherein each of the plurality of second gates has a first portion that is overlapped with a part of a corresponding one of said plurality of first gates and a second portion that is not overlapped with the corresponding one of said plurality of first gates.

51. A method for detecting correlation between a plurality of groups of information signals, comprising the steps of:

changing a combination of cell signal to be compared with each other, the cell signals selected from the groups of information signals;

comparing corresponding cell signals of the changed combination of cell signals with each other and detecting a maximum value or a minimum value of the compared cell signals;

calculating output signals based on said maximum value or said minimum value of the compared cell signals; and comparing an obtained result of calculation from said calculating step with a reference signal in accordance with the combination of cell signals determined in said changing step.

52. A method according to claim 51, wherein said method is performed within a single-chip IC.

* * * * *

UNITED STATES PATENT AND TRADEMARK OFFICE
CERTIFICATE OF CORRECTION

PATENT NO. : 5,917,960

DATED : June 29, 1999

INVENTOR(S) : SHIGETOSHI SUGAWA

It is certified that error appears in the above-identified patent and that said Letters Patent is hereby corrected as shown below:

ON THE TITLE PAGE, [56] References Cited

FOREIGN PATENT DOCUMENTS, "06053431" should read
        --6-053431--; and
    U.S. PATENT DOCUMENTS, "Hasimoto et al." should read
        --Hashimoto et al.--.

COLUMN 1

Line 11, "particularly" should read --particularly,--;
    Line 25, "image" should read --image,--;
    Line 30, ""1"" should read --"1",--; and
    Line 37, "hands" should read --hand,--.

COLUMN 2

Line 66, "Next" should read --Next,--.

COLUMN 4

Line 17, "he" should read --the--;
    Line 25, "aspects" should read --aspect,--; and
    Line 29, "images" should read --images,--.

COLUMN 5

Line 21, "14(8);" should read --14(B);--.

UNITED STATES PATENT AND TRADEMARK OFFICE
CERTIFICATE OF CORRECTION

PATENT NO. : 5,917,960

DATED : June 29, 1999

INVENTOR(S) : SHIGETOSHI SUGAWA

It is certified that error appears in the above-identified patent and that said Letters Patent is hereby corrected as shown below:

COLUMN 6

Line 48, "dispoded" should read --disposed--;
    Line 59, "transistor 25" should read --transistor 15--; and
    Line 65, "HPX" should read --MPX--.

COLUMN 7

Line 21, "HPX" should read --MPX--; and
    Line 22, "examples" should read --example,--.

COLUMN 8

Line 9, "cells" should read --cell,--;
    Line 25, "FIG. 3" should read --FIG. 3,--; and
    Line 60, "respectively" should read --respectively.--.

COLUMN 9

Line 40, "low)" should read --low).--; and
    Line 45, "form" should read --from--.

COLUMN 10

Line 7, "illustrate" should read --illustrates-- and "pathes" should read --paths--;
    Line 8, "fucuses" should --focuses--; and
    Line 62, "selectors 4," should read --selector 4,--.

UNITED STATES PATENT AND TRADEMARK OFFICE
CERTIFICATE OF CORRECTION

PATENT NO. : 5,917,960

DATED : June 29, 1999

INVENTOR(S) : SHIGETOSHI SUGAWA

It is certified that error appears in the above-identified patent and that said Letters Patent is hereby corrected as shown below:

COLUMN 11

Line 3, "selector 40" should read --selector 4.--;
    Line 8, "circuit" 8" should read --circuit") 8--; and
    Line 39, "Similarly" should read --Similarly,--.

COLUMN 12

Line 22, "achive" should read --achieve--; and
    Line 58, "4m+3, In" should read --4m+3, in--.

COLUMN 13

Line 20, "cases" should read --case--;
    Line 28, "circuit 5," (second occurrence) should read --circuit 6,--; and
    Line 41, "the," should read --the--.

COLUMN 14

Line 3, "illustrate" should read --illustrates--;
    Line 4, "pathes" should read --paths--;
    Line 5, "fucuses" should read --focuses--;
    Line 34, "time serially" should read --time-serially--; and
    Line 59, "particularly," should read --particularly--.

COLUMN 15

Line 10, "embodiments" should read --embodiment.--;
    Line 26, "serves" should read --serve--; and
    Line 33, "doner" should read --donor--.

UNITED STATES PATENT AND TRADEMARK OFFICE
CERTIFICATE OF CORRECTION

PATENT NO. : 5,917,960

DATED : June 29, 1999

INVENTOR(S) : SHIGETOSHI SUGAWA

It is certified that error appears in the above-identified patent and that said Letters Patent is hereby corrected as shown below:

COLUMN 16

Line 42, "no layer" should read --$n^+$ layer--;
Line 50, "Particularly " should read --Particularly,--;
Line 53, "oxided" should read --oxidized--;
Line 59, "oxidation" should read --oxidation,--; and
Line 67, "60" should be deleted.

COLUMN 17

Line 9, "HPX" should read --MPX--;
Line 13, "HPX" should read --MPX--;
Line 15, "HPX" should read --MPX--; and
Line 41, "a" (second occurrence) should be deleted.

COLUMN 18

Line 3, "gates Reset" should read --gates. Reset--;
Line 13, "output" should read --output to--; and
Line 67, "croups" should read --groups--.

COLUMN 19

Line 53, "calculation" should read --comparison--.

UNITED STATES PATENT AND TRADEMARK OFFICE
CERTIFICATE OF CORRECTION

PATENT NO. : 5,917,960

DATED : June 29, 1999

INVENTOR(S) : SHIGETOSHI SUGAWA

It is certified that error appears in the above-identified patent and that said Letters Patent is hereby corrected as shown below:

COLUMN 23

Line 14, "signal" should read --signals--.

Signed and Sealed this

Fifteenth Day of February, 2000

Attest:

Q. TODD DICKINSON

Attesting Officer

Commissioner of Patents and Trademarks